(12) United States Patent
Jacob et al.

(10) Patent No.: US 10,253,174 B2
(45) Date of Patent: *Apr. 9, 2019

(54) VULCANIZED POLYMER BLENDS

(71) Applicant: ExxonMobil Chemical Patents Inc., Baytown, TX (US)

(72) Inventors: Sunny Jacob, Seabrook, TX (US); Peijun Jiang, League City, TX (US); Aspy K. Mehta, Humble, TX (US); Pradeep Shirodkar, McKinney, TX (US); Armenag H. Dekmezian, Austin, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/658,134

(22) Filed: Jul. 24, 2017

(65) Prior Publication Data

US 2018/0009976 A1 Jan. 11, 2018

Related U.S. Application Data

(60) Division of application No. 14/315,425, filed on Jun. 26, 2014, now Pat. No. 9,745,461, which is a continuation-in-part of application No. 11/296,842, filed on Dec. 7, 2005, now abandoned, said application No. 14/315,425 is a continuation-in-part of application No. 11/454,950, filed on Jun. 16, 2006, now abandoned.

(60) Provisional application No. 60/693,030, filed on Jun. 22, 2005.

(51) Int. Cl.
| | |
|---|---|
| *C08L 23/10* | (2006.01) |
| *C08L 23/12* | (2006.01) |
| *C08L 47/00* | (2006.01) |
| *C08L 23/16* | (2006.01) |
| *C08L 23/14* | (2006.01) |

(52) U.S. Cl.
CPC .............. *C08L 47/00* (2013.01); *C08L 23/10* (2013.01); *C08L 23/12* (2013.01); *C08L 23/16* (2013.01); *C08L 23/145* (2013.01); *C08L 2312/00* (2013.01); *C08L 2314/06* (2013.01)

(58) Field of Classification Search
CPC .......... C08L 23/10; C08L 23/12; C08L 23/16; C08L 47/00; C08L 23/145; C08L 2312/00; C08L 2314/06
See application file for complete search history.

(56) References Cited

U.S. PATENT DOCUMENTS

| | | |
|---|---|---|
| 3,629,212 A | 12/1971 | Benedikter et al. |
| 3,689,597 A | 9/1972 | Mahlman |
| 3,882,197 A | 5/1975 | Fritz et al. |
| 3,888,949 A | 6/1975 | Shih |
| 4,016,342 A | 4/1977 | Wagensommer |
| 4,059,651 A | 11/1977 | Smith, Jr. |
| 4,130,535 A | 12/1978 | Coran et al. |
| 4,146,692 A | 3/1979 | Wagensommer et al. |
| 4,276,195 A | 6/1981 | Verkade |
| 4,306,041 A | 12/1981 | Cozewith et al. |
| 4,311,628 A | 1/1982 | Abdou-Sabet et al. |
| 4,999,403 A | 3/1991 | Datta et al. |
| 5,350,817 A | 9/1994 | Winter et al. |
| 5,504,171 A | 4/1996 | Etherton et al. |
| 5,514,761 A | 5/1996 | Etherton et al. |
| 5,598,547 A | 1/1997 | Beard et al. |
| 5,670,595 A | 9/1997 | Meka et al. |
| 5,696,045 A | 12/1997 | Winter et al. |
| 5,723,560 A | 3/1998 | Canich |
| 6,005,053 A | 12/1999 | Parikh et al. |
| 6,114,457 A | 9/2000 | Markel et al. |
| 6,114,477 A | 9/2000 | Merrill et al. |
| 6,117,962 A | 9/2000 | Weng et al. |
| 6,143,846 A | 11/2000 | Herrmann et al. |
| 6,147,180 A | 11/2000 | Markel et al. |
| 6,153,710 A | 11/2000 | Saito et al. |
| 6,184,327 B1 | 2/2001 | Weng et al. |
| 6,197,791 B1 | 3/2001 | Venkatesan et al. |
| 6,197,910 B1 | 3/2001 | Weng et al. |
| 6,201,069 B1 | 3/2001 | Fukazawa et al. |
| 6,207,606 B1 | 3/2001 | Lue et al. |
| 6,207,756 B1 | 3/2001 | Datta et al. |
| 6,225,432 B1 | 5/2001 | Weng et al. |
| 6,245,856 B1 | 6/2001 | Kaufman et al. |

(Continued)

FOREIGN PATENT DOCUMENTS

| | | |
|---|---|---|
| EP | 0 277 004 A | 3/1987 |
| EP | 0 373 660 A | 6/1990 |

(Continued)

OTHER PUBLICATIONS

Galimberti et al., Metallocene-based Polyolefins, Preparation, Properties and Technology, Scheirs et al., Editors, 2000, vol. 1, Chapter 14, pp. 309-343.

Heinen et al., Synthesis and Characterization of Carbon-13 Labelled 2-ethylidene-5-norbornene Containing EPDM Rubber. Observation of Crosslinking and Oxidation, Polymer, 1999, vol. 40, pp. 4353-4363.

Hongjun et al., Structure and Properties of Impact Copolymer Polypropylene. II. Phase Structure and Crystalline Morphology, Journal of Applied Polymer Science, vol. 71, No. 1, pp. 103-113.

(Continued)

*Primary Examiner* — Irina S Zemel

(57) ABSTRACT

A heterogeneous vulcanized polymer blend comprising a continuous phase comprising a thermoplastic polypropylene having a crystallinity of at least 30% and a dispersed phase comprising particles of an elastomeric copolymer dispersed in the continuous phase and having an average particle size of less than 5 micron. The elastomeric copolymer has a crystallinity of less than 20% and is at least partially cross-linked such that no more than about 80 wt % of the elastomeric copolymer is extractable in cyclohexane at 23° C.

12 Claims, 6 Drawing Sheets

(56) References Cited

U.S. PATENT DOCUMENTS

| | | |
|---|---|---|
| 6,248,832 B1 | 6/2001 | Peacock |
| 6,258,903 B1 | 7/2001 | Mawson et al. |
| 6,268,438 B1 | 7/2001 | Ellul et al. |
| 6,271,323 B1 | 8/2001 | Loveday et al. |
| 6,288,171 B2 | 9/2001 | Finerman et al. |
| 6,297,301 B1 | 10/2001 | Erderly et al. |
| 6,303,696 B1 | 10/2001 | Ushioda et al. |
| 6,310,140 B1 | 10/2001 | Raetzsch et al. |
| 6,319,998 B1 | 11/2001 | Cozewith et al. |
| 6,323,284 B1 | 11/2001 | Peacock |
| 6,337,372 B1 | 1/2002 | Saito et al. |
| 6,340,703 B1 | 1/2002 | Kelly |
| 6,342,564 B1 | 1/2002 | Pitkanen et al. |
| 6,342,574 B1 | 1/2002 | Weng et al. |
| 6,376,407 B1 | 4/2002 | Burkhardt et al. |
| 6,376,409 B1 | 4/2002 | Burkhardt et al. |
| 6,376,410 B1 | 4/2002 | Burkhardt et al. |
| 6,376,411 B1 | 4/2002 | Burkhardt et al. |
| 6,376,412 B1 | 4/2002 | Burkhardt et al. |
| 6,376,413 B1 | 4/2002 | Kuchta et al. |
| 6,376,627 B1 | 4/2002 | Burkhardt et al. |
| 6,380,120 B1 | 4/2002 | Burkhardt et al. |
| 6,380,121 B1 | 4/2002 | Kuchta et al. |
| 6,380,122 B1 | 4/2002 | Kuchta et al. |
| 6,380,123 B1 | 4/2002 | Kuchta et al. |
| 6,380,124 B1 | 4/2002 | Burkhardt et al. |
| 6,380,330 B1 | 4/2002 | Burkhardt et al. |
| 6,380,331 B1 | 4/2002 | Kuchta et al. |
| 6,380,334 B1 | 4/2002 | Kuchta et al. |
| 6,388,016 B1 | 5/2002 | Abdou-Sabet et al. |
| 6,399,723 B1 | 6/2002 | Burkhardt et al. |
| 6,407,174 B1 | 6/2002 | Ouhadi |
| 6,407,189 B1 | 6/2002 | Herrmann |
| 6,423,793 B1 | 7/2002 | Weng et al. |
| 6,444,773 B1 | 9/2002 | Markel |
| 6,445,638 B1 | 9/2002 | Hsu et al. |
| 6,555,635 B2 | 4/2003 | Markel |
| 6,569,965 B2 | 5/2003 | Markel et al. |
| 6,573,350 B1 | 6/2003 | Markel et al. |
| 6,635,715 B1 | 10/2003 | Datta et al. |
| 6,660,809 B1 | 12/2003 | Weng et al. |
| 6,750,307 B2 | 6/2004 | Weng et al. |
| 6,770,714 B2 | 8/2004 | Ommundsen et al. |
| 6,774,191 B2 | 8/2004 | Weng et al. |
| 6,780,936 B1 | 8/2004 | Agarwal et al. |
| 6,809,168 B2 | 10/2004 | Agarwal et al. |
| 6,825,372 B2 | 11/2004 | Burkhardt et al. |
| 6,927,265 B2 | 8/2005 | Kaspar et al. |
| 6,977,287 B2 | 12/2005 | Argarwal et al. |
| 7,005,491 B2 | 2/2006 | Weng et al. |
| 7,101,936 B2 | 9/2006 | Weng et al. |
| 7,223,822 B2 | 5/2007 | Abhari et al. |
| 7,256,240 B1 | 8/2007 | Jiang |
| 7,294,681 B2 | 11/2007 | Jiang et al. |
| 7,339,018 B2 | 3/2008 | Arjunan |
| 7,541,402 B2 | 6/2009 | Abhari et al. |
| 7,550,528 B2 | 6/2009 | Abhari et al. |
| 7,619,038 B2 | 11/2009 | Mehta et al. |
| 7,700,707 B2 | 4/2010 | Abhari et al. |
| 7,709,577 B2 | 5/2010 | Jiang et al. |
| 2001/0007896 A1 | 7/2001 | Agarwal et al. |
| 2001/0053837 A1 | 12/2001 | Agarwal et al. |
| 2002/0013440 A1 | 1/2002 | Agarwal et al. |
| 2003/0013623 A1 | 1/2003 | Tse et al. |
| 2003/0181592 A1 | 9/2003 | Watanabe et al. |
| 2003/0195299 A1 | 10/2003 | Stevens et al. |
| 2004/0087749 A1 | 5/2004 | Agarwal et al. |
| 2004/0087750 A1 | 5/2004 | Agarwal et al. |
| 2004/0116609 A1 | 6/2004 | Datta et al. |
| 2004/0127614 A1 | 7/2004 | Jiang et al. |
| 2006/0199873 A1 | 9/2006 | Mehta et al. |
| 2006/0293453 A1 | 12/2006 | Jiang et al. |
| 2006/0293455 A1 | 12/2006 | Jiang et al. |
| 2006/0293460 A1 | 12/2006 | Jacob et al. |
| 2006/0293461 A1 | 12/2006 | Jiang et al. |
| 2007/0001651 A1 | 1/2007 | Harvey |
| 2007/0129497 A1 | 6/2007 | Jiang et al. |
| 2007/0282073 A1 | 12/2007 | Weng et al. |
| 2007/0284787 A1 | 12/2007 | Weng et al. |
| 2008/0081878 A1 | 4/2008 | Jiang et al. |
| 2010/0152360 A1 | 6/2010 | Jiang et al. |
| 2010/0152382 A1 | 6/2010 | Jiang et al. |
| 2010/0152383 A1 | 6/2010 | Jiang et al. |
| 2010/0152388 A1 | 6/2010 | Jiang et al. |
| 2010/0152390 A1 | 6/2010 | De Gracia et al. |

FOREIGN PATENT DOCUMENTS

| | | |
|---|---|---|
| EP | 0 374 695 A | 6/1990 |
| EP | 0 395 083 A | 10/1990 |
| EP | 0 400 333 A | 12/1990 |
| EP | 0 619 325 A | 10/1994 |
| EP | 0 629 631 B | 12/1994 |
| EP | 0 629 632 A | 12/1994 |
| EP | 0 426 637 B | 5/1995 |
| EP | 0 770 106 B | 2/1997 |
| EP | 1 002 814 A | 5/2000 |
| EP | 1 354 901 A | 10/2003 |
| JP | 01132643 A | 5/1989 |
| JP | 11335501 A | 7/1999 |
| WO | 98/32784 A | 7/1998 |
| WO | 98/49229 A | 11/1998 |
| WO | 99/45062 A | 9/1999 |
| WO | 01/09200 A | 2/2001 |
| WO | 01/81493 A | 11/2001 |

OTHER PUBLICATIONS

Markel et al., Metallocene-Based Branch-Block Thermoplastic Elastomers, Macromolecules, 2000, vol. 33, No. 23, pp. 8541-8548.

Scheirs et al., Metallocene-Based Polyolefins, vol. 1, Wiley Series in Polymer Science, 2000, John Wiley & Sons Ltd.

Vara, Techniques for achieving high hardness EPDM formulations, Rubber World, Feb. 2003, vol. 227, Issue 5, pp. 33-38.

Polymer Data Handbook, James E. Mark, Ed., 1999, Oxford University Press, pp. 780-786.

U.S. Appl. No. 60/693,030, filed Jun. 22, 2005.

Figure 1A (image size = 20×20 µm)
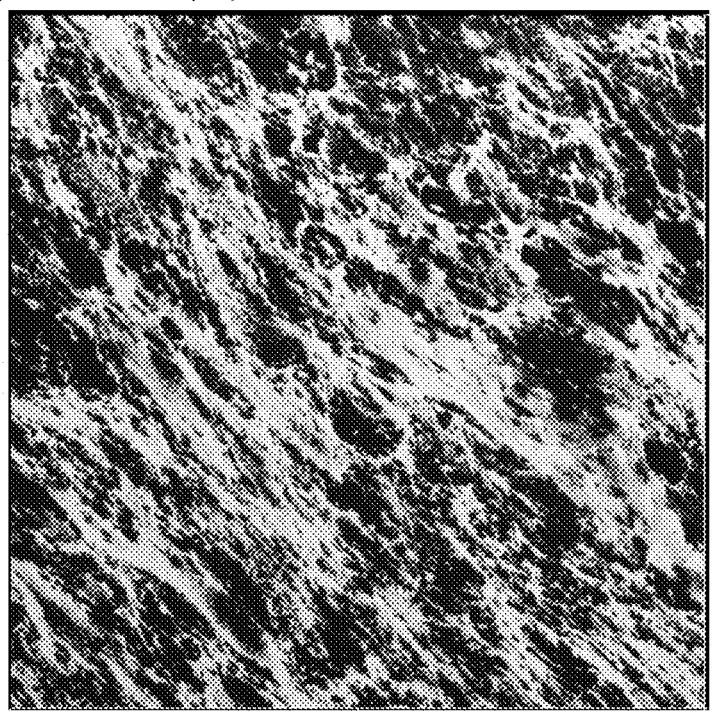

Figure 1B (image size = 20×20 μm)
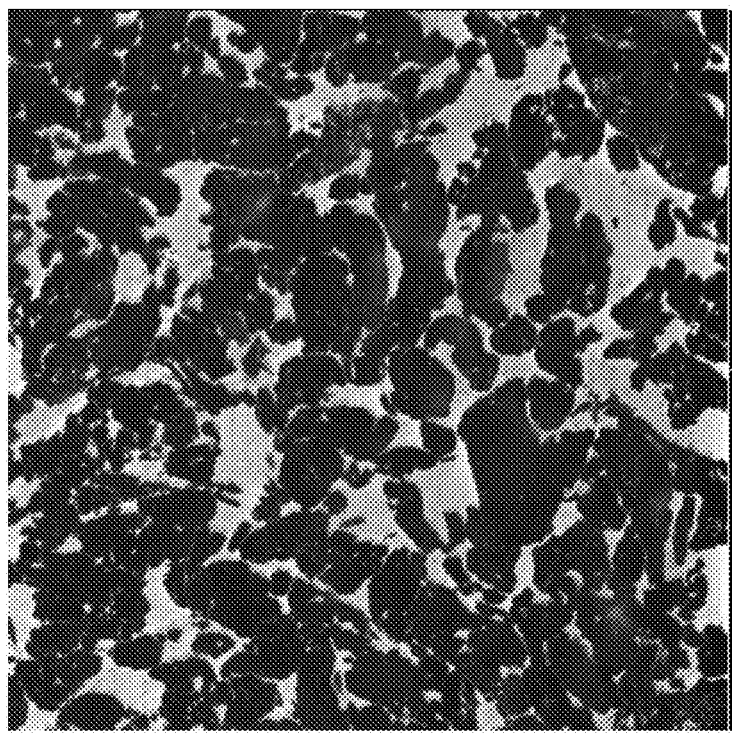

Figure 2A (image size = 50×50 μm)
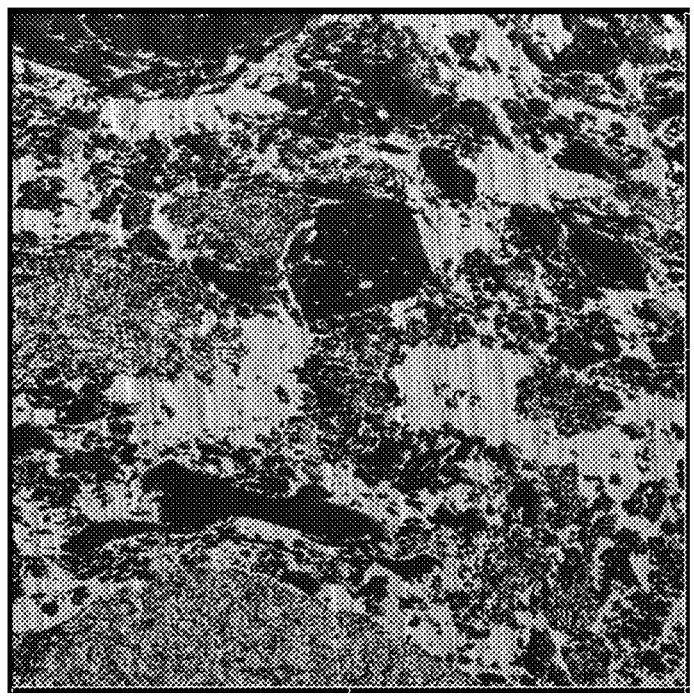

Figure 2B (image size = 50×50 μm)
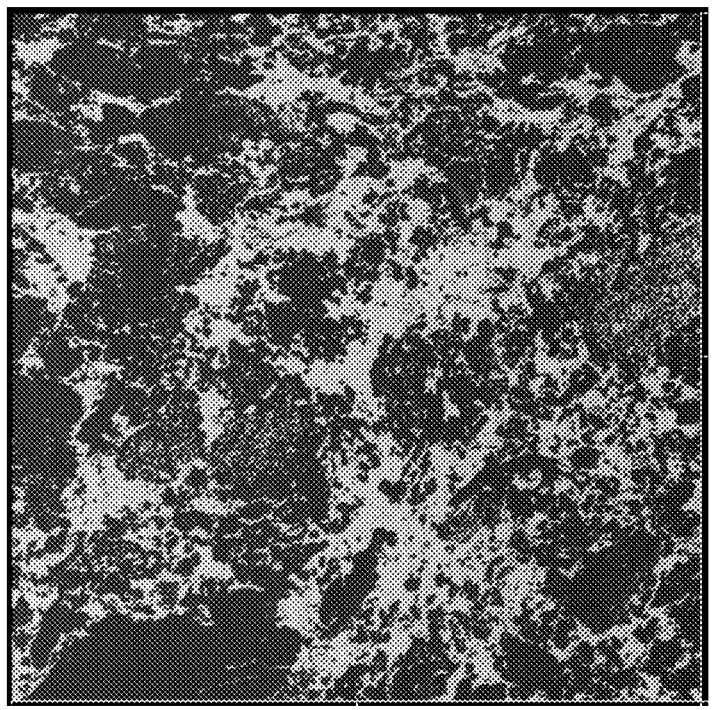

Figure 3A (image size = 20×20 μm)
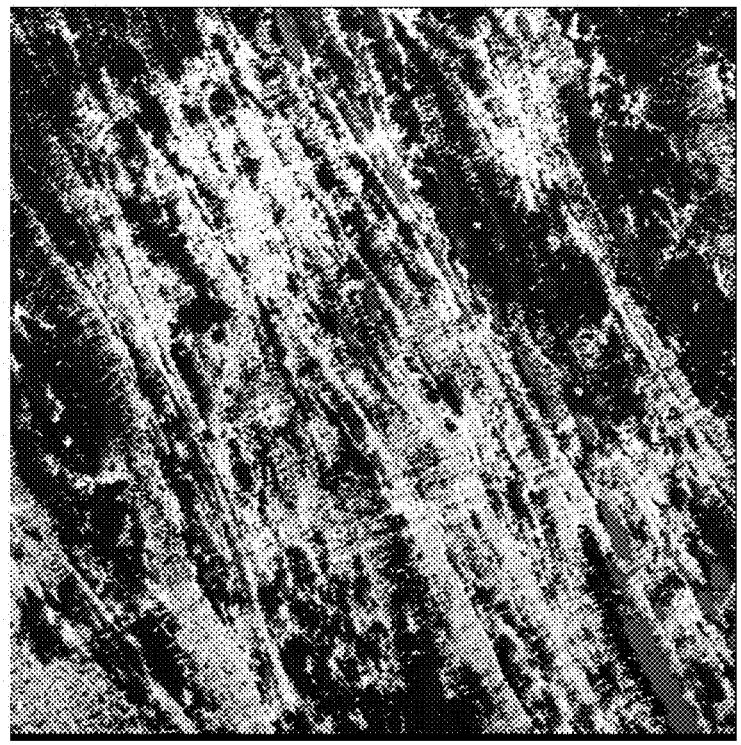

Figure 3B (image size = 20×20 μm)
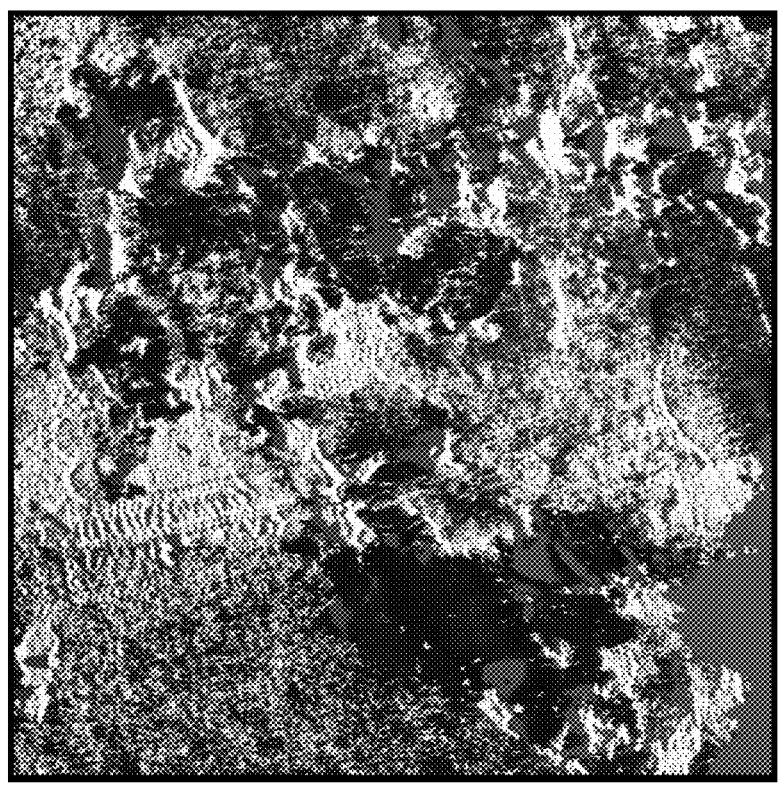

VULCANIZED POLYMER BLENDS

CROSS REFERENCE TO RELATED APPLICATIONS

The present application is a divisional application of U.S. Ser. No. 14/315,425 filed on Jun. 26, 2014, which is a continuation-in-part of U.S. Ser. No. 11/296,842 filed on Dec. 7, 2005, which claims priority to U.S. Provisional Patent Application No. 60/693,030, filed on Jun. 22, 2005 as well as U.S. Ser. No. 11/454,950 filed Jun. 16, 2006, which also claims priority to U.S. Provisional Patent Application No. 60/693,030, filed on Jun. 22, 2005.

FIELD

This invention relates to a heterogeneous vulcanized polymer blends comprising a continuous phase of a polypropylene and discrete particles of a cross-linked elastomeric copolymer dispersed in the polypropylene, and to a process of making such a polymer blend.

BACKGROUND

Heterogeneous polymer blends comprising an elastomeric copolymer dispersed in a continuous phase of a polypropylene are well-known and, depending on the properties and the relative amounts of the first and elastomeric copolymers, a wide variety of such polymer blends can be produced. Of particular interest are polymer blends, also referred to as thermoplastic elastomers, in which the polypropylene is a thermoplastic material, such as polypropylene, and the elastomeric copolymer is an elastomeric material, such as an ethylene-propylene elastomer or an ethylene-propylene-diene (EPDM) rubber. Examples of such thermoplastic elastomers include polypropylene impact copolymers, thermoplastic olefins and thermoplastic vulcanizates.

Unlike conventional vulcanized rubbers, thermoplastic elastomers can be processed and recycled like thermoplastic materials, yet have properties and performance similar to that of vulcanized rubber at service temperatures. For this reason, thermoplastic elastomers are useful for making a variety of articles such as weather seals, hoses, belts, gaskets, moldings, boots, elastic fibers and like articles. They are also particularly useful for making articles by blow molding, extrusion, injection molding, thermo-forming, elasto-welding and compression molding techniques. In addition, thermoplastic elastomers are often used for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, and valve guides.

One method of making the aforementioned polymer blends is by mixing two different polymers after they have been polymerized to achieve a target set of properties. However, this method is relatively expensive making it much more desirable to make blends by direct polymerization. Blending by direct polymerization is well known in the prior art and typically uses multiple reactors in series, where the product from one reactor is fed to a second reactor having a different polymerizing environment, resulting in a final product that is an intimate mix of two different products. Examples of such processes employing vanadium catalysts in series reactor operation to produce different types of EPDM compositions are disclosed in U.S. Pat. Nos. 3,629,212, 4,016,342, and 4,306,041.

U.S. Pat. No. 6,245,856 discloses a thermoplastic olefin composition comprising polypropylene, an ethylene-α-olefin elastomer and a compatabilizer comprising an ethylene-propylene copolymer having a propylene content of greater than 80 wt %. According to this patent, the individual components of the composition can be separately manufactured and mechanically blended together in a mechanical mixer or two or more of the components can be prepared as a reactor blend using a series of reactors where each component is prepared in a separate reactor and the reactant is then transferred to another reactor where a second component is prepared. In the absence of the compatabilizer, the elastomer phase is said to be uneven with particle size greater than 5 microns, whereas the addition of the compatabilizer is said to improve dispersion such that the elastomer phase has a particle size of about 1 micron. The elastomer phase of this polymer blend is not cross-linked.

U.S. Pat. No. 6,207,756 describes a process for producing a blend of a continuous phase of a semi-crystalline plastic, such as polypropylene, and a discontinuous phase of an amorphous elastomer, such as a terpolymer of ethylene, a $C_3$-$C_{20}$ α-olefin and a non-conjugated diene. The blends are produced in series reactors by producing a polypropylene component in a first reactor, directing the effluent to a second reactor and producing the elastomeric copolymer component in solution in the second reactor in the presence of the polypropylene component. U.S. Pat. No. 6,319,998 also discloses using series solution polymerizations to produce blends of ethylene copolymers. U.S. Pat. No. 6,770,714 discloses the use of parallel polymerizations to produce different polymeric components that are then blended through extrusion or using other conventional mixing equipment. One polymeric component is a propylene homopolymer or copolymer and the elastomeric copolymer component is an ethylene copolymer.

One particularly useful form of thermoplastic elastomer is a thermoplastic vulcanizate ("TPV"), which comprises a thermoplastic resin continuous phase, such as polypropylene, within which are dispersed particles of a vulcanized elastomeric material, such as an EPDM rubber. TPVs are normally produced by a process of "dynamic vulcanization", which is a process of vulcanizing or cross-linking the elastomeric component during intimate melt mixing with the thermoplastic resin, together with plasticizers (e.g. process oils), fillers, stabilizers, and a cross-linking system, under high shear and above the melting point of the thermoplastic. The mixing is typically done in a twin-screw extruder, to create a fine dispersion of the elastomeric material within the thermoplastic resin while the elastomeric material is vulcanized. The levels of thermoplastic resin and plasticizer (oil) can be adjusted to produce grades having different profiles of hardness, rheology and engineering properties, although in general it is difficult to produce TPVs by dynamic vulcanization in which the content of the elastomeric phase is greater than 50 wt % of the overall polymer blend. Examples of dynamic vulcanization are described in the U.S. Pat. Nos. 4,130,535 and 4,311,628.

However, while dynamic vulcanization is effective in producing TPVs with a unique profile of properties, it is expensive and suffers from a number of disadvantages. Thus the production of quality product is technically challenging and specialized equipment is needed. Moreover, the process involves many steps, each one critical to the eventual quality of the final product. Forming the polymer blend normally involves separately comminuting bales of the elastomeric polymer (which is typically how EPDM rubber is commercially distributed), mechanically mixing it with the thermoplastic resin along with the processing oils, cross-linking agents, and other ingredients in a suitable high shear mixing device to comminute the rubber particles and vulcanize them to generate vulcanized rubber particles embedded in a continuous thermoplastic resin continuous phase. The vulcanized rubber particles in the finished products have an averaged particle size of 1 to 10 micron. While the products produced with existing technology have many desirable properties, there are gaps in the overall properties profile. Some of these are the need for higher service temperatures, improved elastic recovery, softer products, higher Tensile Strength, easier processability, oil-free compositions, and colorless products.

An improved process for producing TPVs is disclosed in U.S. Pat. No. 6,388,016, incorporated herein in its entirety, in which a polymer blend is produced by solution polymerization in series reactors employing metallocene catalysts and the resultant blend is subjected to dynamic vulcanization. It will, however, be seen that this improved process still relies on dynamic vulcanization to vulcanize the elastomeric component. As a result the vulcanized diene-containing particles have an average particle size in the range of 1 to 10 microns.

An in-reactor process for producing cross-linked polymer blends, such as TPVs, is disclosed in our co-pending US 2006/0293455 filed Jun. 16, 2006. In this process, at least one first monomer is polymerized to produce a thermoplastic polypropylene; and then at least part of the polypropylene is contacted with at least one second monomer and at least one diene under conditions sufficient to produce and simultaneously cross-link an elastomeric copolymer as a dispersed phase within a continuous phase of the polypropylene. In the resultant polymer blend, the thermoplastic polypropylene has a crystallinity of at least 30% and the dispersed phase comprises particles of the elastomeric copolymer having an average size of less than 1 micron, wherein the elastomeric copolymer has a crystallinity of less than 20% and is at least partially cross-linked. In this way, the need for a separate dynamic vulcanization step to cross-link the elastomeric copolymer is avoided. However, for certain applications, it is desirable to enhance the level of curing of the elastomeric copolymer beyond that achieved by the in-reactor cross-linking. Accordingly, the present invention seeks to provide a polymer blend, and a process of its production, having an enhanced level of curing.

SUMMARY

The invention described herein includes a heterogeneous vulcanized polymer blend comprising (or consisting essentially of) (a) a continuous phase comprising a polypropylene having a crystallinity of at least 30% and a melting point temperature $T_m$ greater than 130° C., and a heat of fusion $\Delta H_f$ greater than 65 J/g; and (b) a dispersed phase comprising particles of an elastomeric copolymer dispersed in the continuous phase and having an average particle size of less than 5 micron, the elastomeric copolymer comprising ethylene units and 0.001 to 5 wt % diene by weight of the copolymer, and having a crystallinity of less than 20% and being at least partially cross-linked prior to addition of cross-linking agents such that the degree of cross-link is at least 20%; and (c) cross-linking agents. By "consisting essentially of", what is meant is that no more than 5 wt % of additives, by weight of the vulcanized blend and additive, is present.

Also disclosed is a process for producing an heterogeneous vulcanized polymer blend comprising (a) a continuous phase comprising a thermoplastic polypropylene that is semi-crystalline; and (b) a dispersed phase comprising particles of a elastomeric copolymer different from the polypropylene dispersed in the continuous phase, the elastomeric copolymer having a crystallinity less than that of the polypropylene and being at least partially cross-linked, the process comprising: (i) polymerizing at least one first monomer to produce a thermoplastic polypropylene that is semi-crystalline; (ii) contacting at least part of the polypropylene with at least one second monomer and at least one diene under conditions sufficient to polymerize the second monomer to produce, and simultaneously cross-link, the elastomeric copolymer as particles dispersed in the thermoplastic polypropylene; and (iii) subjecting the product produced in (ii) to a vulcanization step by addition of a cross-linking agent to increase the amount of the elastomeric copolymer that is insoluble in xylene.

DESCRIPTION OF THE DRAWINGS

FIGS. 1A and 1B are atomic force micrographs (AFM) of the polymer blends produced in Examples 1C and the post polymerization vulcanized composition in Formulation 16, respectively.

FIGS. 2A and 2B are atomic force micrographs (AFM) of the polymer blends produced in Examples 3A and the post polymerization vulcanized composition in Formulation 34, respectively.

FIGS. 3A and 3B are atomic force micrographs (AFM) of the polymer blends produced in Examples 4B and the post polymerization vulcanized composition in Formulation 45, respectively.

DETAILED DESCRIPTION

For purposes of this invention and the claims thereto when a polymer or oligomer is referred to as comprising an olefin, the olefin present in the polymer or oligomer is the polymerized or oligomerized form of the olefin, respectively. Likewise the use of the term polymer is meant to encompass homopolymers and copolymers. In addition the term copolymer includes any polymer having 2 or more monomers. Thus, as used herein, the term "polypropylene" means a polymer made of at least 50% propylene units, preferably at least 70% propylene units, more preferably at least 80% propylene units, even more preferably at least 90% propylene units, even more preferably at least 95% propylene units or 100% propylene units.

The term "vulcanization" refers to the physicochemical change resulting from cross-linking of the unsaturated regions within a polymer or polymers which may or may not be facilitated by a cross-linking agent, which is usually effected by application of heat and/or sheer forces to the polymer or polymer blend, such as by single or twin-screw extrusion. As used herein the term "cross-linking agent" means any of the additives conventionally added to polymer blends to effect curing of one or more components of the blend during a post-polymerization, vulcanization or dynamic vulcanization step. Examples of known cross-linking agents include sulfur, sulfur donors, metal oxides, resin systems, such as phenolic resins, peroxide-based systems, hydrosilation with platinum or peroxide and the like, both with and without accelerators and co-agents.

The phrase "dynamic vulcanization" refers to a vulcanization or curing process for a rubber contained in a blend with a thermoplastic resin, wherein the rubber is cross-linked or vulcanized under conditions of high shear at a temperature above the melting point of the thermoplastic. Dynamic vulcanization can occur in the presence of a processing oil, or the oil can be added after dynamic vulcanization (i.e., post added), or both (i.e., some can be added prior to dynamic vulcanization and some can be added after dynamic vulcanization).

As used herein the term "bulky monomer" means an olefin monomer that is not a linear $C_2$ to $C_{20}$ α-olefin. Bulky monomers include cyclic olefin monomers, such as 5-ethylidene-2-norbornadiene (ENB), 5-vinyl-2-norbornene (VNB) and cyclopentadiene; branched olefin monomers, such as 3,5,5-trimethyl hexene-1; and macromonomers, such as terminally unsaturated oligomers or terminally unsaturated polymers.

As used herein, the term "terminal unsaturation" is defined to mean vinyl unsaturation, vinylene unsaturation or vinylidene unsaturation on a polymer chain end, with vinyl unsaturation being preferred.

As used herein, the term "heterogeneous blend" means a composition having two or more morphological phases in the same state. For example, a blend of two polymers where one polymer forms discrete packets dispersed in a matrix or "continuous phase" of another polymer is said to be heterogeneous in the solid state. Also a heterogeneous blend is defined to include co-continuous blends where the blend components are separately visible, but it is unclear which is the "continuous phase" and which is the discontinuous phase. Such morphology is determined using scanning electron microscopy (SEM) or atomic force microscopy (AFM). In the event the SEM and AFM provide different data, then the AFM data are used.

In contrast, a "homogeneous blend" is a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on a dynamic mechanical thermal analyzer (DMTA) trace of tan δ (i.e., the ratio of the loss modulus to the storage modulus) versus temperature. By contrast, two separate transition temperatures would be observed for an immiscible blend, typically corresponding to the temperatures for each of the individual components of the blend. Thus a polymer blend is miscible when there is one Tg indicated on the DMTA trace. A miscible blend is homogeneous, while an immiscible blend is heterogeneous.

The heterogeneous polymer blend of the invention comprises particles of an "at least partially cross-linked elastomeric copolymer", wherein the cross-linking is produced by an in-situ reaction between a diene and the elastomeric copolymer followed by a post-polymerization curing step. The inventive blends are referred to as "in-situ", meaning there has been no post-reactor blending, vulcanization, etc., but simply a polymer blend formed from the polymerization process. The presence and amount of such partially cross-linked polymers in the blend can be determined by a multi-step solvent extraction process. In this process the product of the prior to the post-polymerization curing step is first contacted with cyclohexane at 25° C. for 48 hours to dissolve the un-vulcanized and lightly branched elastomeric components of the blend and then the remaining solids are refluxed at the boiling temperature of xylene for 24 hours with xylene to isolate the "at least partially cross-linked polymer". The "at least partially cross-linked polymer" is also referred to herein as "xylene insolubles". Details of the solvent extraction procedure are given in the Examples.

Melting temperature ($T_m$) and crystallization temperature ($T_c$), referred to herein, are measured using Differential Scanning calorimetry (DSC) according to ASTM E 794-85. Details of the DSC test are given in the Examples. Heat of fusion ($\Delta H_f$) is measured according to ASTM D 3417-99, and percentage crystallinity is calculated using heat of fusion as described below.

This invention relates to a heterogeneous polymer blend comprising a semi-crystalline (at least 30% crystalline) thermoplastic polypropylene that constitutes the continuous phase and particles of an elastomeric copolymer different from, and less crystalline than, the polypropylene dispersed within the continuous phase. The dispersed particles typically have an average size of less than 5 or 4 or 3 microns, for example in the range of about 50 nanometers to less than 0.5 microns. Preferably, the dispersed particles have an average size of less than 3 micron, such as less than 2 microns, for example less than or equal to 1 micron, for example between about 100 nanometers and about 1 micron. The discrete particles of the elastomeric copolymer are produced by an initial in-situ cross-linking chemistry that takes place concurrently with the synthesis of the elastomeric copolymer and are then subjected to a subsequent, ex-situ (or post reactor) dynamic vulcanization step.

This invention also relates to a process for making the above polymer blend. In a reactor, a semi-crystalline polypropylene is produced in a polypropylene polymerization step. In an elastomeric copolymerization step, an elastomeric polymer is synthesized, in the presence of the semi-crystalline polymer phase. The elastomer takes the form of a fine particle size dispersion in the semi-crystalline polypropylene phase. The elastomer is cross-linked through the use of multifunctional monomers, particularly a diene having at least two polymerizable unsaturated groups, with the degree of cross-linking being controlled by the reaction environment during the polymerization.

The resultant heterogeneous polymer blends contain hybrid polymer. While not wishing to bound by theory, it is believed that reactive intermediates generated in the propylene polymerization step engage in the polymerization processes taking place in the elastomeric copolymerization step, producing hybrid polymers (also known as branch-block copolymers) that combine the characteristics of the polymers formed in the first and second reactor zones, such as the melting temperature of the polypropylene and the lower glass transition temperatures of the elastomeric copolymer.

Following the two polymerization steps, the product composition is subjected to a dynamic vulcanization step to enhance the degree of cross-linking of the elastomeric phase.

Continuous Phase of the Blend

The continuous phase of the present heterogeneous polymer blend may be any crystalline or semi-crystalline thermoplastic polymer or a mixture thereof. Preferable thermoplastic polymers are polypropylenes have a crystallinity of at least 30%, more preferably at least 40%, and most preferably at least 60% as determined by differential scanning calorimetry (DSC). The polypropylene provides the composition with required Tensile Strength and temperature resistance. Accordingly, the "polypropylenes" useful herein have a melting temperature, as measured by DSC, above 120° C., preferably above 130° C., more preferably above 140° C., and most preferably within a range of from 130 or 140 or 145 or 150° C. to 165 or 170° C. are desired.

Typically, the polypropylene has a crystallization temperature (Tc) between about 92 and about 120° C., such as between about 95 and about 110° C. The polypropylene useful herein preferably comprise vinyl terminal groups, preferably within the range from 0.40 or 0.45 vinyl/chain to 0.60 or 0.80 or 1.0 vinyl/chain.

In any embodiment, the continuous phase of the inventive compositions is a "polypropylene" which comprises propylene homopolymers, copolymers of propylene, or mixtures of propylene homopolymers and copolymers. The term "crystalline," as used herein, characterizes those polymers that possess high degrees of inter- and intra-molecular order in the solid state. Heat of fusion ($\Delta H_f$), a measure of crystallinity, greater than 65 J/g, alternatively at least 70 J/g, alternatively at least 80 J/g, or within a range of from 65 or 70 J/g to 90 or 100 or 110 J/g as determined by DSC analysis, is preferred. The $\Delta H_f$ is dependent on the composition of the polypropylene. A propylene homopolymer will have a higher $\Delta H_f$ than a copolymer or blend of a homopolymer and copolymer.

The continuous phase can vary widely in composition. For example, substantially isotactic polypropylene homopolymer or propylene copolymer containing 10 wt % or less of a comonomer can be used (i.e., at least 90% by weight propylene). Further, polypropylene segments may be part of graft or block copolymers having a sharp melting point above 110° C., and alternatively above 115° C., and alternatively above 130° C., and more preferably above 140° C., or and most preferably within a range of from 145 or 150° C. to 165 or 170° C. and characteristic of the stereoregular propylene sequences. The continuous phase may be a combination of homopolypropylene, and/or random, and/or block copolymers as described herein. When the continuous phase is a random copolymer, the percentage of the copolymerized α-olefin in the copolymer is, in general, up to 9% by weight, alternatively 0.5% to 8% by weight, alternatively 2% to 6% by weight. The preferred α-olefins contain 2 or from 4 to 12 carbon atoms. One, two or more α-olefins can be copolymerized with propylene.

Dispersed Phase of the Blend

The dispersed phase of the inventive heterogeneous polymer blend is generally an elastomeric copolymer and is polymerized and at the same time cross-linked in the presence of the polypropylene or other crystalline or semicrystalline thermoplastic polymer. The "elastomeric copolymer" is generally an amorphous or low crystallinity (having a crystallinity of less than 20%) polymer and in particular may include any elastomer or mixture thereof that is capable of forming a cross-linked system during the polymerization. Most preferable elastomeric copolymers for use in the present invention are rubbery copolymers produced by copolymerizing two or more α-olefins with at least one diene. More typically, the elastomeric component is a copolymer of ethylene with at least one α-olefin monomer, and at least one diene monomer. The α-olefins may include, but are not limited to, $C_3$ to $C_{20}$ α-olefins, such as propylene, 1-butene, 1-hexene, 4-methyl-1-pentene, 1-octene, 1-decene, or combinations thereof. The preferred α-olefins are propylene, 1-hexene, 1-octene or combinations thereof. Thus, for example, the elastomeric copolymer can be an ethylene-propylene-diene terpolymer. Typically, the elastomeric copolymer contains at least 15 wt % of the $C_3$ to $C_{20}$ olefin and at least 0.0001 wt % of the diene. More preferably, the diene units are present within a range of from 0.01 or 0.1 or 1.0 wt % to 2 or 5 wt % of the elastomeric copolymer; the α-olefin units are preferably present to within a range of from 20 or 30 wt % to 40 or 50 or 60 wt % of the elastomeric copolymer, the remainder of the copolymer being ethylene units, preferably at least 20 wt % or 30 wt % or 40 wt % or of the elastomeric copolymer in the polymer blends, or within a range from 10 or 15 or 20 or 25 or 30 wt % to 40 or 45 or 50 or 60 wt %.

Another suitable elastomeric polymer for use in the present invention includes amorphous polypropylene.

In any embodiment, the inventive blend comprises a diene that has at least two polymerizable unsaturated bonds that can readily be incorporated into polymers to form cross-linked polymers. Examples of such dienes include α,ω-dienes (such as butadiene, 1,4-pentadiene, 1,5-hexadiene, 1,6-heptadiene, 1,7-octadiene, 1,8-nonadiene, 1,9-decadiene, 1.10-undecadiene, 1,11-dodecadiene, 1,12-tridecadiene, and 1,13-tetradecadiene) and certain multi-ring alicyclic fused and bridged ring dienes (such as tetrahydroindene; norbornadiene; dicyclopentadiene; bicyclo-(2.2.1)-hepta-2,5-diene; 5-vinyl-2-norbornene; 3,7-dimethyl-1,7-octadiene; 1,4-cyclohexadiene; 1,5-cyclooctadiene; 1,7-cyclododecadiene and vinyl cyclohexene).

In any embodiment of the inventive blend, a diene that has at least two unsaturated bonds wherein one of the unsaturated bonds is readily incorporated into a polymer may be present in addition to at least one of those dienes above. The second bond may partially take part in polymerization to form cross-linked polymers but normally provides at least some unsaturated bonds in the polymer product suitable for subsequent functionalization (such as with maleic acid or maleic anhydride), curing or vulcanization in post polymerization processes. Examples of dienes according to said further embodiment include, but are not limited to butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, and polybutadienes having a molecular weight ($M_w$) of less than 1000 g/mol. Examples of straight chain acyclic dienes include, but are not limited to 1,4-hexadiene and 1,6-octadiene. Examples of branched chain acyclic dienes include, but are not limited to 5-methyl-1,4-hexadiene, 3,7-dimethyl-1,6-octadiene, and 3,7-dimethyl-1,7-octadiene. Examples of single ring alicyclic dienes include, but are not limited to 1,4-cyclohexadiene, 1,5-cyclooctadiene, and 1,7-cyclododecadiene. Examples of multi-ring alicyclic fused and bridged ring dienes include, but are not limited to tetrahydroindene; norbornadiene; methyl-tetrahydroindene; dicyclopentadiene; bicyclo-(2.2.1)-hepta-2,5-diene; and alkenyl-, alkylidene-, cycloalkenyl-, and cylcoalkyliene norbornenes [including, e.g., 5-methylene-2-norbornene, 5-ethylidene-2-norbornene, 5-propenyl-2-norbornene, 5-isopropylidene-2-norbornene, 5-(4-cyclopentenyl)-2-norbornene, 5-cyclohexylidene-2-norbornene, and 5-vinyl-2-norbornene]. Examples of cycloalkenyl-substituted alkenes include, but are not limited to vinyl cyclohexene, allyl cyclohexene, vinyl cyclooctene, 4-vinyl cyclohexene, allyl cyclodecene, vinyl cyclododecene, and tetracyclo (A-11,12)-5,8-dodecene.

According to one aspect of the invention, during the elastomeric copolymerization step to produce the elastomeric phase, it is believed that a distribution of cross-products are formed emanating principally from the grafting of the first thermoplastic polymer to the second elastomeric polymer. These hybrid cross-products, also known as branch-block copolymers, form when reactive intermediates from the polypropylene polymerization step cross-over into the elastomeric copolymerization step and participate in the polymerization of the elastomeric copolymer. The presence of branch-block copolymers is believed to influence the events occurring during the polymerization as well as product properties. The extent of influence depends on the population distribution of the branch-block copolymer fraction.

The amount of elastomeric copolymer relative to the polypropylene may vary widely depending on the nature of the polymers and the intended use of the final polymer blend. In particular, however, one advantage of the process of the invention is the ability to be able to produce a heterogeneous polymer blend in which the discrete particles of the elastomeric copolymer comprise more than 50 wt %, such as more than 60 wt %, for example more than 70 wt % of the total heterogeneous polymer blend. In any embodiment, the weight ratio of the elastomeric copolymer to the polypropylene is generally from about 90:10 to about 50:50, more preferably from about 80:20 to about 60:40, and most preferably from about 75:25 to about 65:35. For TPO or impact copolymer applications, the weight ratio of the elastomeric copolymer to the polypropylene is generally from about 49:51 to about 10:90, more preferably from 35:65 to about 15:85.

Production of the Polymer Blend

The inventive polymer blend is produced by a two-step polymerization process, followed by a post-polymerization curing step. In the first step, a crystalline thermoplastic polymer, preferably polypropylene homopolymer, is produced by polymerizing at least one first monomer, preferably propylene, in one or more polymerization zones. The effluent from the first step is then fed into a second step where an elastomer is produced in the presence of the polymer produced in the first step. The elastomer is in-situ cross-linked, at least partially, in the elastomeric copolymerization zone. The cross-linked elastomer forms finely dispersed microgel particles embedded within the crystalline thermoplastic continuous phase.

In an alternative embodiment, the first step of polymerization is replaced with addition of pre-made crystalline thermoplastic polymer. The pre-made polymer can be produced in a separate system or can be a commercially available product. The crystalline thermoplastic polymer can be dissolved in a solvent and then added into a reaction medium for the elastomeric copolymerization step. The crystalline thermoplastic polymer can be also ground into fine powder and then added into the reaction medium for the elastomeric copolymerization step.

Any known polymerization process may be used to produce the thermoplastic polymer. For example, the polymer may be a propylene homopolymer obtained by homopolymerization of propylene in a single stage or multiple stage reactor. Copolymers may be obtained by copolymerizing propylene and an α-olefin having 2 or from 4 to 20 carbon atoms in a single stage or multiple stage reactor. Polymerization methods include high pressure, slurry, gas, bulk, suspension, supercritical, or solution phase, or a combination thereof, using a traditional Ziegler-Natta catalyst or a single-site, metallocene catalyst system, or combinations thereof including bimetallic (i.e., Z/N and/or metallocene) catalysts. Preferred catalysts are those capable of polymerizing a $C_2$ to $C_{20}$ olefin to produce a polypropylene having at least 30% crystallinity and at least 0.01 or 0.1 or 0.2 (vinyl/chain) terminal unsaturation. The catalysts can be in the form of a homogeneous solution, supported, or a combination thereof. Polymerization may be carried out by a continuous, a semi-continuous or batch process and may include use of chain transfer agents, scavengers, or other such additives as deemed applicable. By "continuous" is meant a system that operates (or is intended to operate) without interruption or cessation. For example a continuous process to produce a polymer would be one where the reactants are continually introduced into one or more reactors and polymer product is continually withdrawn.

Where the thermoplastic continuous phase comprises a polyolefin, such as a propylene polymer or copolymer, the polyolefin will generally be produced in the presence of a single site catalyst, preferably a metallocene catalyst, with an activator and optional scavenger. Preferred metallocene catalysts are those capable of polymerizing a $C_2$ to $C_{20}$ olefin to produce a polypropylene having at least 30% crystallinity.

Preferred metallocene catalysts useful for producing the thermoplastic polypropylene in the process of the invention are not narrowly defined but generally it is found that the most suitable are those in the generic class of bridged, substituted bis(cyclopentadienyl) metallocenes, specifically bridged, substituted bis(indenyl) metallocenes known to produce high molecular weight, high melting temperature $T_m$, highly isotactic propylene polymers. Particularly suitable catalysts are bridged bis-indenyl metallocene catalysts having a substituent on one or both of the 2- and 4-positions on each indenyl ring or those having a substituent on the 2-, 4-, and 7-positions on each indenyl ring. Generally speaking, those of the generic class disclosed in U.S. Pat. No. 5,770,753 (fully incorporated herein by reference) should be suitable, however, it has been found that the exact polymer obtained is dependent on the metallocene's specific substitution pattern, among other things. A specific list of useful catalyst compounds is found at WO 2004/026921 page 29 paragraph [00100] to page 66, line 4. In another embodiment, the catalyst compounds described at WO 2004/026921 page 66, paragraph [00103] to page 70, line 3 may also be used in the practice of this invention.

Particularly preferred are racemic metallocenes, such as rac-dimethylsiladiyl(2-isopropyl,4-phenylindenyl)$_2$ zirconium dichloride; rac-dimethylsiladiyl(2-isopropyl,4-[1-naphthyl]indenyl)$_2$ zirconium dichloride; rac-dimethylsiladiyl(2-isopropyl,4-[3,5-dimethylphenyl]indenyl)$_2$ zirconium dichloride; rac-dimethylsiladiyl(2-isopropyl,4-[ortho-methyl-phenyl]indenyl)$_2$ zirconium dichloride; rac-dimethylsilyl bis-(2-methyl, 4-phenylindenyl)zirconium dichloride, rac dimethylsiladlyl bis-(2-methyl, 4-napthylindenyl) zirconium dichloride, rac-dimethyl siladiyl(2-isopropyl, 4-[3,5 di-t-butyl-phenyl]indenyl)$_2$ zirconium dichloride; rac-dimethyl siladiyl(2-isopropyl, 4-[orthophenyl-phenyl]indenyl)$_2$ zirconium dichloride, rac-diphenylsiladiyl(2-methyl-4-[1-naphthyl]indenyl)$_2$ zirconium dichloride and rac-biphenyl siladiyl(2-isopropyl, 4-[3,5 di-t-butyl-phenyl]indenyl)$_2$ zirconium dichloride. Alkylated variants of these metallocenes (e.g. di-methyl instead of dichloride) are also useful, particularly when combined with a non-coordinating anion type activator. These and other metallocene compositions are described in detail in U.S. Pat. Nos. 6,376,407, 6,376,408, 6,376,409, 6,376,410, 6,376,411, 6,376,412, 6,376,413, 6,376,627, 6,380,120, 6,380,121, 6,380,122, 6,380,123, 6,380,124, 6,380,330, 6,380,331, 6,380,334, 6,399,723 and 6,825,372.

The manner of activation of the catalyst used in the polypropylene polymerization step can vary. Alumoxane and preferably methyl alumoxane (MAO) can be used. Non- or weakly coordinating anion activators (NCA) may be obtained in any of the ways described in EP277004, EP426637. Activation generally is believed to involve abstraction of an anionic group such as the methyl group to form a metallocene cation, although according to some literature zwitterions may be produced. The NCA precursor can be an ion pair of a borate or aluminate in which the precursor cation is eliminated upon activation in some manner, e.g. trityl or ammonium derivatives of tetrakis pentafluorophenyl boron (See EP277004). The NCA precursor can be a neutral compound such as a borane, which is formed into a cation by the abstraction of and incorporation of the anionic group abstracted from the metallocene (See EP426638).

The alumoxane activator may be utilized in an amount to provide a molar aluminum to metallocene ratio of from 1:1 to 20,000:1 or more. The non-coordinating compatible anion activator may be utilized in an amount to provide a molar ratio of metallocene compound to non-coordinating anion of 10:1 to 1:1.

Particularly useful activators include dimethylanilinium tetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this invention may be found at page 72, paragraph [00177] to page 74, paragraph [00178] of WO 2004/046214.

Preferably, the polypropylene polymerization step is conducted in a continuous, stirred tank reactor. Tubular reactors equipped with the hardware to introduce feeds, catalysts and cross-linking agents in staged manner can also be used. Generally, polymerization reactors are agitated (stirred) to reduce or avoid concentration gradients. Reaction environments include the case where the monomer(s) acts as diluent or solvent as well as the case where a liquid hydrocarbon is used as diluent or solvent. Preferred hydrocarbon liquids include both aliphatic and aromatic fluids such as desulphurized light virgin naphtha and alkanes, such as propane, isobutane, mixed butanes, hexane, pentane, isopentane, cyclohexane, isooctane, and octane. In an alternate embodiment a perfluorocarbon or hydrofluorocarbon is used as the solvent or diluent.

Suitable conditions for the polypropylene polymerization step include a temperature from about 50 to about 250° C., preferably from about 50 to about 150° C., more preferably from about 70 to about 150° C. and a pressure of 0.1 MPa or more, preferably 2 MPa or more. The upper pressure limit is not critically constrained but is typically 200 MPa or less, preferably, 120 MPa or less, except when operating in a supercritical phase then the pressure and temperature are above the critical point of the reaction media in question (typically over 95° C. and 4.6 MPa for propylene polymerizations). For more information on running supercritical polymerizations, see WO 2004/026921. Temperature control in the reactor is generally obtained by balancing the heat of polymerization with reactor cooling via reactor jackets or cooling coils, auto refrigeration, pre-chilled feeds, vaporization of liquid medium (diluent, monomers or solvent) or combinations of all three. Adiabatic reactors with pre-chilled feeds may also be used.

In the elastomeric copolymerization step, some or all of the polypropylene formed in the polypropylene polymerization step are contacted with at least one second monomer, typically ethylene and a $C_3$ to $C_{20}$ olefin, and at least one cross-linking agent, typically a diene, under conditions sufficient to polymerize the second monomer(s) to produce the elastomeric copolymer and also cross-link the elastomeric copolymer. As a result of the cross-linking that occurs with the elastomeric copolymerization step, the product of the elastomeric copolymerization step contains at least a fraction which is insoluble in xylene. Preferably, the amount of the xylene insoluble fraction by weight of the elastomeric copolymer, also referred to herein as the degree of cross-link of the elastomeric copolymer, is at least 4%, such as at least 10%, such as at least 20%, such as at least 40%, such as at least 50%.

Any known polymerization process, including solution, suspension, slurry, supercritical and gas phase polymerization processes, and any known polymerization catalyst can be used to produce the elastomeric copolymer component. Generally, the catalyst used to produce the elastomeric copolymer component should be capable of polymerizing bulky monomers and also be capable of producing a polymer having an Mw of 20,000 or more and a crystallinity of less than 20%.

In one embodiment, the catalyst employed to produce the elastomeric copolymer component is the same as, or is compatible with, the catalyst used to produce the thermoplastic continuous phase. In such a case, the first and elastomeric copolymerization zones can be in a multiple-zone reactor, or separate, series-connected reactors, with the entire effluent from the polypropylene polymerization zone, including any active catalyst, being transferred to the elastomeric copolymerization zone. Additional catalyst can then be added, as necessary to the elastomeric copolymerization zone. In a particularly preferred embodiment, the process of the invention is conducted in two or more series-connected, continuous flow, stirred tank or tubular reactors using metallocene catalysts.

In another embodiment, catalyst quenching is applied between the two polymerization zones and a separate catalyst is introduced in the second reaction zone to produce the elastomer component. Catalyst quenching agents (such as air or an alcohol) may be introduced into the effluent from the polypropylene polymerization zone right after the reactor exit to deactivate the catalyst used for the polypropylene polymerization. Scavenger may be useful and can be fed into the effluent downstream of the catalyst quenching agent injection point or the elastomeric copolymerization zone.

Where a separate catalyst is used to produce the elastomeric elastomeric copolymer, this is conveniently one of, or a mixture of, metallocene compounds of either or both of the following types:

1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. These cyclopentadienyl complexes are represented by the formula

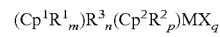

wherein $Cp^1$ of ligand $(Cp^1 R^1{}_m)$ and $Cp^2$ of ligand $(Cp^2 R^2{}_p)$ are the same or different cyclopentadienyl rings, $R^1$ and $R^2$ each is, independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4, or 5, p is 0, 1, 2, 3, 4, or 5, and two $R^1$ and/or $R^2$ substituents on adjacent carbon atoms of the cyclopentadienyl ring associated there with can be joined together to form a ring containing from 4 to about 20 carbon atoms, $R^3$ is a bridging group, n is the number of atoms in the direct chain between the two ligands and is 0, 1, 2, 3, 4, 5, 6, 7, or 8, preferably 0, 1, 2, or 3, M is a transition metal having a valence of 3, 4, 5, or 6, preferably from Group 4, 5, or 6 of the Periodic Table of the Elements and is preferably in its highest oxidation state, each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, q is equal to the valence of M minus 2.

2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or 16 of the periodic table of the elements. These mono-cyclopentadienyl complexes are represented by the formula

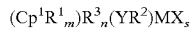

wherein $R^1$ is, each independently, a halogen or a hydrocarbyl, halocarbyl, hydrocarbyl-substituted organometalloid or halocarbyl-substituted organometalloid group containing up to about 20 carbon atoms, m is 0, 1, 2, 3, 4, or 5, and two $R^1$ substituents on adjacent carbon atoms of the cyclopentadienyl ring associated therewith can be joined together to form a ring containing from 4 to about 20 carbon atoms, $R^3$ is a bridging group, n is 0, or 1, M is a transition metal having a valence of from 3, 4, 5, or 6, preferably from Group 4, 5, or 6 of the Periodic Table of the Elements and is preferably in its highest oxidation state, Y is a heteroatom containing group in which the heteroatom is an element with a coordination number of three from Group 15 or a coordination number of two from Group 16 preferably nitrogen, phosphorous, oxygen, or sulfur, $R^2$ is a radical independently selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R_2$ groups on Y each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, s is equal to the valence of M minus 2; $Cp^1$ is a Cp ring.

Examples of suitable biscyclopentadienyl metallocenes of the type described in Group 1 above for the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614, all of which are incorporated by reference herein.

Illustrative, but not limiting examples of preferred biscyclopentadienyl metallocenes of the type described in Group 1 above for the invention are the racemic isomers of:

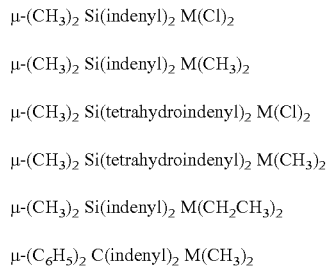

wherein M is chosen from a group consisting of Zr and Hf.

Examples of suitable unsymmetrical cyclopentadienyl metallocenes of the type described in Group 1 above for the invention are disclosed in U.S. Pat. Nos. 4,892,851; 5,334,677; 5,416,228; and 5,449,651; and are described in publication 110 J. AM. CHEM. Soc. 6255 (1988), all of which are incorporated by reference herein.

Illustrative, but not limiting examples of preferred unsymmetrical cyclopentadienyl metallocenes of the type described in Group 1 above for the invention are:

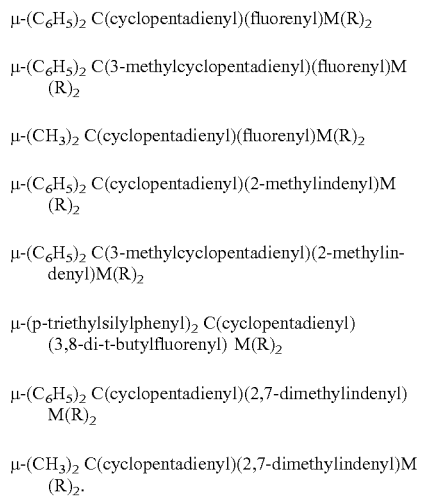

wherein M is chosen from the group consisting of Zr and Hf and R is chosen from the group consisting of Cl and $CH_3$.

Examples of suitable monocyclopentadienyl metallocenes of the type described in group 2 above for the invention are disclosed in U.S. Pat. Nos. 5,026,798; 5,057,475; 5,350,723; 5,264,405; 5,055,438 and are described in WO 96/002244, all of which are incorporated by reference herein.

Illustrative, but not limiting examples of preferred monocyclopentadienyl metallocenes of the type described in group 2 above for the invention are:

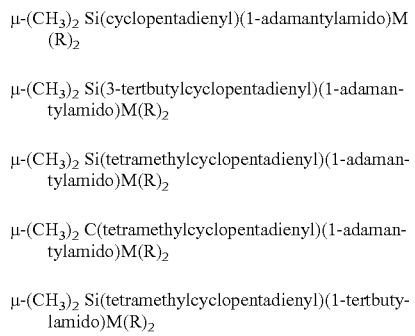

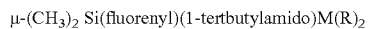

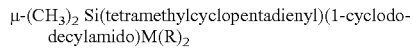

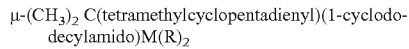

wherein M is selected from a group consisting of Ti, Zr, and Hf and wherein R is selected from Cl and $CH_3$.

Another class of organometallic complexes that are useful catalysts for producing the elastomeric copolymer component are those with diimido ligand systems such as those described in WO 96/23010 assigned to Du Pont. These catalytic polymerization compounds are incorporated here by reference.

In a preferred processing mode, the conditions in the elastomeric copolymerization zone are arranged not only to copolymerize the elastomer monomers with the bifunctional monomer, such as a diene, but also to cause at least partial cross-linking of resultant elastomer. Typical conditions in the elastomeric copolymerization zone include a temperature of about 10° C. to about 250° C. and a pressure of about 0.1 MPa to about 200 MPa.

The elastomeric copolymer, which is at least partially cross-linked in the copolymerization reaction of olefins and dienes, may be prepared by solution, suspension or slurry polymerization of the olefins and diene under conditions in which the catalyst site remains relatively insoluble and/or immobile so that the polymer chains are rapidly immobilized following their formation. Such immobilization is affected, for example, by (1) using a solid, insoluble catalyst, (2) maintaining the polymerization below the crystalline melting point of thermoplastic polymers made in the first step and (3) using low solvency solvent such as a fluorinated hydrocarbon.

In a solution process, the un-crosslinked elastomeric copolymers are dissolved (or are soluble) in the polymerization media. The elastomeric copolymers are then phase separated from the reaction media to form micro-particles when the polymers are cross-linked. This in-situ cross-link and phase separation facilitates the process to produce high molecular weight polymers. Maintaining the polymerization conditions in the second step below the cloudy point of the thermoplastic polymer produced in the first step is instrumental to producing second polymer with micro-sized gel in the second stage of polymerization. Previously, it wasn't well understood why the presence of isotactic polypropylene (iPP) can reduce reactor gel formation. The speculation was that the iPP formed microscopic pockets within the crystalline network in the reaction medium in the second stage. The second polymerization and cross-linking reaction takes place within the microscopic pockets. This confined polymerization environments prevent the micro-gel particles from agglomeration, thereby minimizing inter-particle cross-linking and formation of big gel. In contrast, if the cross-linking reaction is not controlled to localized domains, uncontrolled cross-linking will interconnect the polymeric contents of the entire reactor, leading to reactor macro-gel formation and fouling.

By selecting the catalysts, the polymerization reaction conditions, and/or by introducing a diene modifier, some molecules of the polypropylene(s) and the elastomeric copolymer(s) can be linked together to produce branch-block structures. While not wishing to be bound by theory, the branch-block copolymer is believed to comprise an amorphous backbone having crystalline side chains originating from the polypropylene.

To effectively incorporate the polymer chains of the polypropylene into the growing chains of the elastomeric copolymer, it is preferable that the polypropylene polymerization step produces macromonomers having reactive termini, such as vinyl end groups. By macromonomers having reactive termini is meant a polymer having twelve or more carbon atoms (preferably 20 or more, more preferably 30 or more, more preferably between 12 and 8000 carbon atoms) and having a vinyl, vinylidene, vinylene or other terminal group that can be polymerized into a growing polymer chain. By capable of polymerizing macromonomer having reactive termini is meant a catalyst component that can incorporate a macromonomer having reactive termini into a growing polymer chain. Vinyl terminated chains are generally more reactive than vinylene or vinylidene terminated chains. Generally, it is desirable that the polypropylene polymerization step produces a polypropylene having at least 0.01 vinyl/chain, preferably 0.1 vinyl/chain, more preferably 0.2 vinyl/chain.

Optionally the thermoplastic polypropylenes are copolymers of one or more α-olefins and one or more of monomers having at least two olefinically unsaturated bonds. Both of these unsaturated bonds are suitable for and readily incorporated into a growing polymer chain by coordination polymerization using either the first or second catalyst systems independently such that one double bond is incorporated into the polypropylene segments while another double bond is incorporated into the second elastomeric polymer segments to form a branched block copolymer. In a preferred embodiment these monomers having at least two olefinically unsaturated bonds are di-olefins, preferably di-vinyl monomers.

A polymer can be recovered from the effluent of either the polypropylene polymerization step or the elastomeric copolymerization step by separating the polymer from other constituents of the effluent using conventional separation means. For example, polymer can be recovered from either effluent by coagulation with a non-solvent such as isopropyl alcohol, acetone, or n-butyl alcohol, or the polymer can be recovered by stripping the solvent or other media with heat or steam. One or more conventional additives such as antioxidants can be incorporated in the polymer during the recovery procedure. Possible antioxidants include phenyl-beta-naphthylamine; di-tert-butylhydroquinone, triphenyl phosphate, heptylated diphenylamine, 2,2'-methylene-bis (4-methyl-6-tert-butyl)phenol, and 2,2,4-trimethyl-6-phenyl-1,2-dihydroquinoline. Other methods of recovery such as by the use of lower critical solution temperature (LCST) followed by devolatilization are also envisioned. The catalyst may be deactivated as part of the separation procedure to reduce or eliminate further uncontrolled polymerization downstream the polymer recovery processes. Deactivation may be effected by the mixing with suitable polar substances such as water, whose residual effect following recycle can be counteracted by suitable sieves or scavenging systems.

Properties of the in-Reactor Cross-Linked Polymer Blend Prior to Post Polymerization Dynamic Vulcanization Curing By virtue of the novel polymerization process used in its production, the as-synthesized heterogeneous polymer blend not only comprises particles of the elastomeric copolymer dispersed within a continuous phase of the first thermoplastic polymer but also at least a portion the dispersed phase is cross-linked and comprises a hybrid species of the first and elastomeric copolymers having characteristics of the first and elastomeric copolymers such as a melting temperature, preferably of at least 100° C., in the xylene insoluble fraction. In addition, it is found that the particles of the elastomeric copolymer tend be more evenly distributed and significantly smaller, typically having an average diameter of less than 1 micron, than products obtained by conventional reactive extrusion techniques.

In addition, since at least some cross-linking of the dispersed phase occurs during the elastomeric copolymerization step, rather than all the cross-linking being effected in a subsequent dynamic extrusion step, the dispersed phase of the as-synthesized heterogeneous polymer blend comprises at least a fraction which is insoluble in xylene and which is substantially free of the cross-linking agents normally added to polymers blends to effect cross-linking during post-polymerization, dynamic extrusion. By substantially free is meant that the dispersed phase contains less than 1,000 ppm, such as less than 100 ppm, such as less than 10 ppm, of a cross-linking agent. In any embodiment, the degree of cross-link for the inventive, in situ blend (prior to post-reactor cross-linking) is at least 20 or 30 or 40%, or within a range from 20 or 30 or 35% to 70 or 80 or 85 or 90%.

Polymers with bimodal distributions of molecular weight and composition can be produced by the polymerization process of the invention, by, for example, controlling the polymerization conditions in the first and the elastomeric copolymerization zones and selecting the catalysts for the first and the elastomeric copolymerizations, such as by using multiple catalysts in each polymerization zone. Some of the polymer chains produced in the polypropylene polymerization zone are still live in the elastomeric copolymerization zone. The polymer chains so produced in the elastomeric copolymerization zone contain crystalline polymer segments and amorphous polymer segments and form blocky structures. The blocky compositions have characteristics of both the first and elastomeric copolymers.

The individual components of the present heterogeneous polymer blend can readily be separated by solvent extraction. In a suitable solvent extraction regime, the blend, without undergoing any additional processing steps, is contacted with cyclohexane at 25° C. for 48 hours to dissolve the un-vulcanized and branched elastomeric components of the blend and then the remaining solids are refluxed at the boiling temperature of xylene for 24 hours with xylene to dissolve the continuous thermoplastic phase material. The remaining xylene insolubles comprise the cross-linked hybrid copolymers of the first and elastomeric copolymers. These hybrid copolymers typically exhibit a melting temperature in excess of 100° C.

The in-situ reactor blend of the present invention has many desirable properties. In any embodiment the melting point temperature of the in-situ reactor blend is within a range from 145 or 148° C. to 160 or 165 or 170° C. In any embodiment the in-situ reactor blend has a $\Delta H_f$ within the range from 18 or 20 or 25 J/g to 45 or 50 or 60 or 65 or 70 or 75 J/g.

In any embodiment the in-situ reactor blend has a 100% Modulus of greater than 200 or 250 or 300 or 350 or 400 or 500 or 600 psi, or within the range from 200 or 250 or 300 psi to 2000 or 2100 or 2300 or 2500 psi. In any embodiment, the in-situ reactor blend has an Ultimate Elongation within the range from 80 or 100 or 120 to 340 or 360 or 400%. In any embodiment, the in-situ reactor blend has a Compression set within the range from (70° C./22 Hrs) 20 or 24 or 26% to 60 or 64 or 68 or 70 or 74%. In any embodiment, the in-situ reactor blend has a Tension Set within the range from 6 or 8 or 10% to 35 or 40 or 45%. Finally, in any embodiment the in-situ reactor blend has a Ultimate Tension Strength within the range from 500 or 520 to 2300 or 2400 or 2500 or 2600 psi.

Post Polymerization Dynamic Vulcanization Curing

Although the present polymer blend undergoes partial cross-linking during the elastomeric copolymerization step, the elastomeric phase of the in-reactor product inherently contains unreacted pendant double bonds. According to the present invention, the in-reactor product is therefore subjected to a finishing operation in which the unreacted double bonds undergo post polymerization curing to increase the curing density of the rubber phase. The increased curing density results in an increase in the fraction of the rubber phase that is insoluble in xylene and a decrease in the fraction that is soluble in cyclohexane. Preferably, following post polymerization curing, the fraction of the dispersed rubber phase insoluble in xylene comprises at least 50%, such as at least 70%, such as at least 80%, such as at least 85%, such as at least 95%, of the dispersed phase. In addition, preferably no more than about 50 wt %, more preferably no more than about 30 wt %, and most preferably no more than 20 wt %, of the elastomeric copolymer is extractable in cyclohexane at 23° C.

In one or more embodiments, during the finishing step cross-linking agents can be injected into the effluent stream in polymer finishing equipment to increase the vulcanize density of the dispersed rubber phase by dynamic vulcanization.

In one embodiment, the vulcanize enhancement can be effected by mixing the in reactor made composition at elevated temperature in conventional mixing equipment such as roll mills, stabilizers, Banbury mixers, Brabender mixers, continuous mixers, mixing extruders, polymer finishing equipment such as liquid separation or evaporation vessel, vacuum extraction vessel, strand evaporator, a twin screw extruder, a devolatizing LIST unit, and the like. Methods for preparing thermoplastic vulcanizates is described in U.S. Pat. Nos. 4,311,628 and 4,594,390, which are incorporated herein by reference for purpose of U.S. patent practice, although methods employing low shear rates can also be used. Multiple step processes can also be employed whereby ingredients such as plastics, oils, and scavengers can be added after dynamic vulcanization has been achieved as disclosed in U.S. 2010/324161, which is incorporated herein by reference for purpose of U.S. patent practice.

Those ordinarily skilled in the art will appreciate the appropriate quantities, types of vulcanize systems, and vulcanization conditions required to carry out the vulcanization of the rubber. The rubber can be vulcanized by using varying amounts of cross-linking agent, varying temperatures, and a varying time of vulcanize in order to obtain the optimum cross-linking desired. In general, however, the amount of cross-linking agent employed is such that the dispersed phase of the heterogeneous blend, following post-polymerization curing, comprises at least 0.1 wt % of a cross-linking agent, such as from about 0.5% to about 5% of a cross-linking agent.

Exemplary cross-linking agents include phenolic resin vulcanize systems, peroxide vulcanize systems, and silicon-containing vulcanize systems In one or more embodiments, the phenolic resins include those disclosed in U.S. Pat. Nos. 2,972,600, 3,287,440, 5,952,425 and 6,437,030, and EP 1664188 (A1), which are incorporated herein by reference for purpose of U.S. patent practice.

Phenolic resin cross-linking agents can be referred to as resole resins, and include those resins made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 wt % octyl phenol and from about 70 to about 65 wt % nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which are referred to as alkylphenol-formaldehyde resins. SP-1045 is believed to be an octyl-phenol-formaldehyde resin that contains methylol groups. The SP-1044 and SP-1045 resins are believed to be essentially free of halogen substituents or residual halogen compounds. By "essentially free" of halogen substituents, it is meant that the synthesis of the resin provides for a non-halogenated resin that may only contain trace amounts of halogen containing compounds.

In one or more embodiments, the phenolic resin can be used in combination with a halogen source, such as stannous chloride, and a metal oxide or reducing compound such as zinc oxide. Where a phenolic resin cross-linking agent is employed, a vulcanizing amount of cross-linking agent preferably comprises from about 1 to about 20 parts by weight, more preferably from about 3 to about 16 parts by weight, and even more preferably from about 4 to about 12 parts by weight, phenolic resin per 100 parts by weight rubber.

Useful peroxide cross-linking agents include organic peroxides including, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693.

In one or more embodiments, the peroxide cross-linking agents are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent cross-linking the mixing and dynamic vulcanization are preferably carried out in a nitrogen atmosphere.

Where a peroxide cross-linking agent is employed, a vulcanizing amount of cross-linking agent preferably comprises from about $1\times10^{-4}$ moles to about $2\times10^{-2}$ moles, more preferably from about $2\times10^{-4}$ moles to about $2\times10^{-3}$ moles, and even more preferably from about $7\times10^{-4}$ moles to about $1.5\times1^{-3}$ moles per 100 parts by weight rubber.

Useful silicon-containing vulcanize systems include silicon hydride compounds having at least two SiH groups. It is believed that these compounds react with carbon-carbon double bonds of unsaturated polymers in the presence of a hydrosilation catalyst. Silicon hydride compounds useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. For a further discussion of the use of hydrosilation to vulcanize thermoplastic vulcanizates, reference can be made to U.S. Pat. No. 5,936,028. In one or more embodiments, a silicon-containing cross-linking agent can be employed to vulcanize an elastomeric copolymer including units deriving from 5-vinyl-2-norbornene.

Where silicon-containing cross-linking agent is employed, a vulcanizing amount of cross-linking agent preferably comprises from 0.1 to about 10 mole equivalents, and preferably from about 0.5 to about 5 mole equivalents, of SiH per carbon-carbon double bond.

In one or more embodiments, cross-linking agents that are useful for curing rubber include those described in U.S. Pat. Nos. 5,013,793, 5,100,947, 5,021,500, 4,978,714, and 4,810,752.

In one embodiment, the vulcanized polymer blend described herein has a Tensile Strength at break (as measured by ISO 37 at 23° C.) of 0.5 MPa (73 psi) or more, alternatively 2 MPa (292 psi) or more, alternatively 3 MPa (438 psi) or more, alternatively 4 MPa (585 psi) or more.

In another embodiment, the vulcanized polymer blend described herein has a Shore hardness of 2A to 90D, preferably 10A to 50D (as measured by ISO 868).

In another embodiment, the vulcanized polymer blend described herein has an Ultimate Elongation (as measured by ISO 37) of 20% or more, preferably 100% or more, more preferably 200% or more.

In another embodiment, the vulcanized polymer blend described herein has a Compression Set (as measured by ISO 815A) of 90% or less, preferably 70% or less, more preferably 50% or less, most preferably 30% or less.

In another embodiment, the vulcanized polymer blend described herein has a Tension Set (as measured by ISO 2285) of 100% or less, preferably 80% or less, more preferably 50% or less, most preferably 20% or less.

In another embodiment, the vulcanized polymer blend described herein has an oil swell (as measured by ASTM D471) of 500% or less, preferably 300% or less, more preferably 200% or less, most preferably 100% or less.

More particularly, the post-polymerization vulcanized blend, such as by dynamic vulcanization, of the present invention has many desirable properties. In any embodiment the in-situ reactor blend has a Shore A Hardness within the range from 40 or 50 to 70 or 80 or 90. In any embodiment the post-polymerization vulcanized blend has a 100% Modulus of greater than 200 or 250 or 300 or 350 or 400 or 500 or 600 psi, or within the range from 200 or 250 or 300 or 400 or 500 psi to 1500 or 2000 or 2100 or 2300 or 2500 psi. In any embodiment, the post-polymerization vulcanized blend has an Ultimate Elongation within the range from 80 or 100 to 140 or 200 or 340 or 360 or 400%. In any embodiment, the post-polymerization vulcanized blend has a Compression set within the range from (70° C./22 Hrs) 20 or 24 or 26% to 60 or 64 or 68 or 70 or 74%. In any embodiment, the post-polymerization vulcanized blend has a Tension Set within the range from 6 or 8 or 10% to 35 or 40 or 45%. Finally, in any embodiment the post-polymerization vulcanized blend has a Ultimate Tension Strength within the range from 300 or 400 or 500 or 520 to 2300 or 2400 or 2500 or 2600 psi.

Additives

The heterogeneous polymer blend according to the invention may optionally contain reinforcing and non-reinforcing fillers, plasticizers, antioxidants, stabilizers, rubber processing oils, extender oils, lubricants, antiblocking agents, antistatic agents, waxes, foaming agents, pigments, flame retardants and other processing aids known in the rubber compounding art. Such additives may comprise up to about 70 wt %, more preferably up to about 65 wt %, of the total composition. Fillers and extenders which can be utilized include conventional inorganics such as calcium carbonate, clays, silica, talc, titanium dioxide, carbon black and the like. The rubber processing oils generally are paraffinic, naphthenic or aromatic oils derived from petroleum fractions. The oils are selected from those ordinarily used in conjunction with the specific rubber or rubber component present in the composition.

The additives such as fillers and oils can be introduced into the heterogeneous polymer blend during the polymerization in either the polypropylene polymerization zone or the elastomeric copolymerization zone. The additives can also be added into the effluent from the elastomeric copolymerization zone and are preferably added into the polymer blend after removal of solvent or diluent, or after post-reactor vulcanization, through melt blending. Oils such as Paralux™ oils are particularly useful and may be present with the vulcanized blends of the invention to within a range from 10 or 15 wt % to 20 or 25 or 30 or 25 or 30 or 35 wt %.

Additional polymers can also be added to form blends. In one or more embodiments, the additional polymers include thermoplastic resins. Exemplary thermoplastic resins include crystalline and crystallizable polyolefins. Also, suitable thermoplastic resins may include copolymers of polyolefins with styrene, such as a styrene-ethylene copolymer. In one or more embodiments, the thermoplastic resins are formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. Also suitable are homopolypropylene, as well as impact and random copolymers of propylene with ethylene or the higher α-olefins, described above, or with $C_{10}$-$C_{20}$ diolefins. Preferably, the homopolypropylene has a melting point of at least 130° C., for example at least 140° C. and preferably less than or equal to 170° C., a $\Delta H_f$ of at least 75 J/g, alternatively at least 80 J/g, as determined by DSC analysis, and weight average molecular weight (Mw) of at least 100,000, alternatively at least 500,000. Comonomer contents for the propylene copolymers will typically be from 1 to about 30% by weight of the polymer, for example, See U.S. Pat. Nos. 6,268,438, 6,288,171, and 6,245,856. Copolymers available under the tradename Vistamaxx™ propylene-based elastomer (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

Uses of the Polymer Blends

The heterogeneous polymer blends described herein may be shaped into desirable end use articles by any suitable means known in the art. They are particularly useful for making articles by blow molding, extrusion, injection molding, thermoforming, gas foaming, elasto-welding and compression molding techniques.

Thermoforming is a process of forming at least one pliable plastic sheet into a desired shape. An embodiment of a thermoforming sequence is described, however this should not be construed as limiting the thermoforming methods useful with the compositions of this invention. First, an extrudate film of the composition of this invention (and any other layers or materials) is placed on a shuttle rack to hold it during heating. The shuttle rack indexes into the oven which pre-heats the film before forming. Once the film is heated, the shuttle rack indexes back to the forming tool. The film is then vacuumed onto the forming tool to hold it in place and the forming tool is closed. The forming tool can be either "male" or "female" type tools. The tool stays closed to cool the film and the tool is then opened. The shaped laminate is then removed from the tool.

Thermoforming is accomplished by vacuum, positive air pressure, plug-assisted vacuum forming, or combinations and variations of these, once the sheet of material reaches thermoforming temperatures, typically of from 140° C. to 185° C. or higher. A pre-stretched bubble step is used, especially on large parts, to improve material distribution. In one embodiment, an articulating rack lifts the heated laminate towards a male forming tool, assisted by the application of a vacuum from orifices in the male forming tool. Once the laminate is firmly formed about the male forming tool, the thermoformed shaped laminate is then cooled, typically by blowers. Plug-assisted forming is generally used for small, deep drawn parts. Plug material, design, and timing can be critical to optimization of the process. Plugs made from insulating foam avoid premature quenching of the plastic. The plug shape is usually similar to the mold cavity, but smaller and without part detail. A round plug bottom will usually promote even material distribution and uniform side-wall thickness.

The shaped laminate is then cooled in the mold. Sufficient cooling to maintain a mold temperature of 30° C. to 65° C. is desirable. The part is below 90° C. to 100° C. before ejection in one embodiment. For the good behavior in thermoforming, the lowest melt flow rate polymers are desirable. The shaped laminate is then trimmed of excess laminate material.

Blow molding is another suitable forming means, which includes injection blow molding, multi-layer blow molding, extrusion blow molding, and stretch blow molding, and is especially suitable for substantially closed or hollow objects, such as, for example, gas tanks and other fluid containers. Blow molding is described in more detail in, for example, CONCISE ENCYCLOPEDIA OF POLYMER SCIENCE AND ENGINEERING 90-92 (Jacqueline I. Kroschwitz, ed., John Wiley & Sons 1990).

In yet another embodiment of the formation and shaping process, profile co-extrusion can be used. The profile co-extrusion process parameters are as above for the blow molding process, except the die temperatures (dual zone top and bottom) range from 150° C. to 235° C., the feed blocks are from 90° C. to 250° C., and the water cooling tank temperatures are from 10° C. to 40° C.

One embodiment of an injection molding process is described as follows. The shaped laminate is placed into the injection molding tool. The mold is closed and the substrate material is injected into the mold. The substrate material has a melt temperature between 200° C. and 300° C., such as between 215° C. and 250° C. and is injected into the mold at an injection speed of between 2 and 10 seconds. After injection, the material is packed or held at a predetermined time and pressure to make the part dimensionally and aesthetically correct. Typical time periods are from 5 to 25 seconds and pressures from 1,380 kPa to 10,400 kPa. The mold is cooled between 10° C. and 70° C. to cool the substrate. The temperature will depend on the desired gloss and appearance desired. Typical cooling time is from 10 to 30 seconds, depending on part on the thickness. Finally, the mold is opened and the shaped composite article ejected.

Likewise, molded articles may be fabricated by injecting molten polymer into a mold that shapes and solidifies the molten polymer into desirable geometry and thickness of molded articles. Sheet may be made either by extruding a substantially flat profile from a die, onto a chill roll, or alternatively by calendaring. Sheet will generally be considered to have a thickness of from 10 mils to 100 mils (254 µm to 2540 µm), although sheet may be substantially thicker. Tubing or pipe may be obtained by profile extrusion for uses in medical, potable water, land drainage applications or the like. The profile extrusion process involves the extrusion of molten polymer through a die. The extruded tubing or pipe is then solidified by chill water or cooling air into a continuous extruded articles. The tubing will generally be in the range of from 0.31 cm to 2.54 cm in outside diameter, and have a wall thickness of in the range of from 254 cm to 0.5 cm. The pipe will generally be in the range of from 2.54 cm to 254 cm in outside diameter, and have a wall thickness of in the range of from 0.5 cm to 15 cm. Sheet made from the products of an embodiment of a version of the present invention may be used to form containers. Such containers may be formed by thermoforming, solid phase pressure forming, stamping and other shaping techniques. Sheets may also be formed to cover floors or walls or other surfaces.

In an embodiment of the thermoforming process, the oven temperature is between 160° C. and 195° C., the time in the oven between 10 and 20 seconds, and the die temperature, typically a male die, between 10° C. and 71° C. The final thickness of the cooled (room temperature), shaped laminate is from 10 µm to 6000 µm in one embodiment, from 200 µm to 6000 µm in another embodiment, and from 250 µm to 3000 µm in yet another embodiment, and from 500 µm to 1550 µm in yet another embodiment, a desirable range being any combination of any upper thickness limit with any lower thickness limit.

In an embodiment of the injection molding process, wherein a substrate material is injection molded into a tool including the shaped laminate, the melt temperature of the substrate material is between 230° C. and 255° C. in one embodiment, and between 235° C. and 250° C. in another embodiment, the fill time from 2 to 10 seconds in one embodiment, from 2 to 8 seconds in another embodiment, and a tool temperature of from 25° C. to 65° C. in one embodiment, and from 27° C. and 60° C. in another embodiment. In a desirable embodiment, the substrate material is at a temperature that is hot enough to melt any tie-layer material or backing layer to achieve adhesion between the layers.

In yet another embodiment of the invention, the compositions of this invention may be secured to a substrate material using a blow molding operation. Blow molding is particularly useful in such applications as for making closed articles such as fuel tanks and other fluid containers, playground equipment, outdoor furniture and small enclosed structures. In one embodiment of this process, Compositions of this invention are extruded through a multi-layer head, followed by placement of the uncooled laminate into a parison in the mold. The mold, with either male or female patterns inside, is then closed and air is blown into the mold to form the part.

It will be understood by those skilled in the art that the steps outlined above may be varied, depending upon the desired result. For example, an extruded sheet of the compositions of this invention may be directly thermoformed or blow molded without cooling, thus skipping a cooling step. Other parameters may be varied as well in order to achieve a finished composite article having desirable features.

The thermoplastic elastomer blends of this invention are useful for making a variety of articles such as weather seals, hoses, belts, gaskets, moldings, boots, elastic fibers and like articles. Foamed end-use articles are also envisioned. More specifically, the blends of the invention are particularly useful for making vehicle parts, such as but not limited to, weather seals, brake parts including, but not limited to cups, coupling disks, diaphragm cups, boots such as constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal, plastic combination materials which will be known to those of ordinary skill in the art. Also contemplated are transmission belts including V-belts, toothed belts with truncated ribs containing fabric faced V's, ground short fiber reinforced Vs or molded gum with short fiber flocked V's. The cross section of such belts and their number of ribs may vary with the final use of the belt, the type of market and the power to transmit. They also can be flat made of textile fabric reinforcement with frictioned outside faces. Vehicles contemplated where these parts will find application include, but are not limited to passenger autos, motorcycles, trucks, boats and other vehicular conveyances.

The invention will now be more particularly described with reference to the Examples and the accompanying drawings.

EXAMPLES

In the Examples, molecular weights (number average molecular weight (Mn), weight average molecular weight (Mw), and z-average molecular weight (Mz)) were determined using a Waters 150 Size Exclusion Chromatograph (SEC) equipped with a differential refractive index detector (DRI), an online low angle light scattering (LALLS) detector and a viscometer (VIS). The details of these detectors as well as their calibrations have been described by, for example, T. Sun, P. Brant, R. R. Chance, and W. W. Graessley, in 34(19) MACROMOLECULES 6812-6820 (2001), incorporated herein by reference. Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing $C_2$ to $C_{10}$ monomers is confirmed by Carbon-13 NMR using the method of Randall ($C_{29}$ (2&3) REV. MACROMOL. CHEM. PHYS. 285-297). Linear character for $C_{11}$ and above monomers is confirmed by GPC analysis using a MALLS detector. For example, for a copolymer of propylene, the NMR should not indicate branching greater than that of the co-monomer (i.e., if the comonomer is butene, branches of greater than two carbons should not be present). For a homopolymer of propylene, the GPC should not show branches of more than one carbon atom. When a linear standard is desired for a polymer where the comonomer is $C_9$ or more, one can refer to T. Sun, P. Brant, R. R. Chance, and W. W. Graessley, 34(19) MACROMOLECULES 6812-6820 (2001) for protocols on determining standards for those polymers. In the case of syndiotactic polymers, the standard should have a comparable amount of syndiotacticty as measured by Carbon 13 NMR. The viscosity averaged g' was calculated using the following equation:

$$g'_{vis} = \frac{\sum C_i [\eta_i]_b}{\sum C_i KM_i^\alpha}$$

where $C_i$ is the polymer concentration in the slice i in the polymer peak, and $[\eta_i]_b$ is the viscosity of the branched polymer in slice i of the polymer peak, and $M_i$ is the weight averaged molecular weight in slice i of the polymer peak measured by light scattering, K and α are as defined above.

Peak melting point (Tm) and peak crystallization temperature (Tc) were determined using the following procedure according to ASTM E 794-85. Crystallinity was calculated using $\Delta H_f$ determined using ASTM D 3417-99. Differential scanning calorimetric (DSC) data were obtained using a TA Instruments model Q100 machine or a Perkin-Elmer DSC-7. Samples weighing approximately 5-10 mg were sealed in aluminum sample pans. The DSC data were recorded by first heating it to 200° C. from room temperature at a rate of 10° C./minute (1st melt). Then the sample was kept at 200° C. for 5 minutes before ramping at 10° C./minute to −100° C., followed by isothermal for 5 minutes at −100° C. then heating to 200° C. at a rate of 10° C./minute (2nd melt). Both the first and second cycle thermal events were recorded. The peak melting temperature and $\Delta H_f$ reported in the examples were obtained from the second melt. Areas under the melting curves were measured and used to determine the $\Delta H_f$ and the degree of crystallinity. The percent crystallinity is calculated using the formula, [area under the curve (Joules/gram)/B (Joules/gram)]*100, where B is the $\Delta H_f$ for the homopolymer of the major monomer component. These values for B were obtained from the Polymer Handbook, Fourth Edition, published by John Wiley and Sons, New York 1999. A value of 189 J/g (B) was used as the $\Delta H_f$ for 100% crystalline polypropylene. A value of 290 J/g is used for the $\Delta H_f$ for 100% crystalline polyethylene. For polymers displaying multiple cooling and melting peaks, all the peak crystallization temperatures and peaks melting temperatures were reported. The $\Delta H_f$ for each melting peak was calculated individually.

The glass transition temperature (Tg) was measured by ASTM E 1356 using a TA Instruments model Q100 machine.

Morphology data were obtained using an Atomic Force Microscope (AFM) in tapping phase. All specimens were analyzed within 8 hours after cryofacing to prevent specimen relaxation. During cryofacing, the specimens were cooled to −130° C. and cut with diamond knives in a Reichert cryogenic microtome. They were then stored in a dissector under flowing dry nitrogen gas to warm up to ambient temperatures without condensation being formed. Finally, the faced specimens were mounted in a miniature steel vise for AFM analysis. The AFM measurements were performed in air on a NanoScope Dimension 3000 scanning probe microscope (Digital Instrument) using a rectangular 225-mm Si cantilever. The stiffness of the cantilever was about 4 N/m with a resonance frequency of about 70 kHz. The free vibration amplitude was high, in the range of 80 nm to 100 nm, with a RMS setting of 3.8 volts. While the set point ratio was maintained at a value equal to or lower than 0.5, the contact set point was adjusted routinely to ensure repulsive contacts with positive phase shifts. The cantilever was running at or slightly below its resonance frequency.

AFM phase images of all specimens were converted into a TIFF format and processed using PHOTOSHOP (Adobe Systems, Inc.). The image processing tool kit (Reindeer Games, Inc.) was applied for image measurements. Results of image measurements were written into a text file for subsequent data processing using EXCEL (Microsoft) or MATLAB (MathWorks, Inc.) for computing sizes/shapes of dispersed phases, co-continuity factor of co-continuous phases, or nearest-neighbor inter-particle distances.

Transmission Electron Microscopy (TEM) was used to study details of the interface between the ethylene/propylene/diene rubber and the semi-crystalline polypropylene phases. The instrument used was the JEOL 2000FX microscope. A heavy metal staining technique was employed to provide contrast to delineate the details of the sample morphology. Ruthenium tetroxide provides excellent contrast between amorphous and crystalline regions and was used. Lower density and amorphous polymers take up more stain than do higher density and more crystalline components. Thus heavily stained components appear darker in TEM amplitude contrast images whereas less heavily stained materials appear lighter. The TEM analytical method used involved:

Setting the orientation of the plane of analysis. Typically the MD-ND (machine direction/normal direction) plane is preferred for samples that may be oriented in the machine direction.

Creating a deformation-free face through the bulk polymer sample using a cryomicrotome.

Staining with ruthenium tetroxide vapor for about 8 hours.

Cutting and collecting ultrathin (about 100 nm) sections from the stained face using an ultramicrotome. The cutting is done using a diamond knife. Sections are floated onto TEM grids.

Loading sections into the TEM for examination at the appropriate accelerating voltage (typically 160 to 200 kV).

Examining the sections to determine level of sampling needed.

Acquiring digital images using appropriate vendor software.

The ethylene content of ethylene/propylene copolymers was determined using FTIR according to the following technique. A thin homogeneous film of polymer, pressed at a temperature of about 150° C., was mounted on a Perkin Elmer Spectrum 2000 infrared spectrophotometer. A full spectrum of the sample from 600 $cm^{-1}$ to 4000 $cm^{-1}$ was recorded and the area under propylene band at about 1165 $cm^{-1}$ and the area of ethylene band at about 732 $cm^{-1}$ in the spectrum were calculated. The baseline integration range for the methylene rocking band is nominally from 695 $cm^{-1}$ to the minimum between 745 and 775 $cm^{-1}$. For the polypropylene band the baseline and integration range is nominally from 1195 to 1126 $cm^{-1}$. The ethylene content in wt % was calculated according to the following equation:

$$\text{ethylene content (wt. \%)} = 72.698 - 86.495X + 13.696X^2$$

where $X = AR/(AR+1)$ and AR is the ratio of the area for the peak at about 1165 $cm^{-1}$ to the area of the peak at about 732 $cm^{-1}$.

The number of vinyl chain ends, vinylidene chain ends and vinylene chain ends is determined using $^1H$ NMR at 120° C. using deuterated tetrachloroethane as the solvent on an at least 250 MHz NMR spectrometer, and in selected cases, confirmed by $^{13}C$ NMR. Resconi has reported proton and carbon assignments (neat perdeuterated tetrachloroethane used for proton spectra, while a 50:50 mixture of normal and perdeuterated tetrachloroethane was used for carbon spectra; all spectra were recorded at 100° C. on a Bruker spectrometer operating at 500 MHz for proton and 125 MHz for carbon) for vinyl terminated propylene oligomers in 114 J. AM. CHEM. SOC. 1025-1032 (1992) that are useful herein. Vinyl chain ends are reported as a molar percentage of the total number of moles of unsaturated groups (that is, the sum of allyl chain ends, vinylidene chain ends, vinylene chain ends, and the like) or vinyl per chain.

Solvent extraction was used to isolate the different polymer species of the in-reactor polymer blends. The fractionations were carried out in a two-step successive solvent extraction when the polymer blend did not contain any oil: one involved cyclohexane extraction, the other xylene Soxhlet extraction. In the cyclohexane solvent extraction, about 0.3 gram of polymer was placed in about 60 ml of cyclohexane to isolate the un-vulcanized and lightly branched elastomeric components of the polymer blend. The mixture was continuously stirred at room temperature for about 48 hours. The soluble fraction (referred as cyclohexane solubles) was separated from the insoluble material (referred as cyclohexane insolubles) using filtration under vacuum. The insoluble material was then subjected to the xylene soxhlet extraction procedure. In this step, the insoluble material from the room temperature cyclohexane extraction was first extracted for about 24 hours with xylene. The xylene insoluble portion (referred as xylene insolubles) was recovered by filtration and is the extract containing the at least partially cross-linked elastomeric copolymer. The remaining portion was cooled down to room temperature and retained in a glass container for 24 hours for precipitation. The precipitated component (referred as xylene precipitate) was recovered through filtration and the soluble component (referred as xylene soluble) was recovered by evaporating the xylene solvent. The xylene precipitate fraction is where the thermoplastic crystalline component resides. In the case of blends containing paraffinic oil plasticizer and the like, another Soxhlet solvent extraction step was performed on the sample for 24 hours to isolate the oil from the blend before the cyclohexane extraction and xylene Soxhlet extraction using an azeoptrope of acetone and cyclohexane in the ratio 2:1 by volume.

In order to measure the physical properties of the polymer blends, samples were first mixed in a Brabender melt mixer with about 45 mL mixing head. The polymer was stabilized with antioxidant during mixing in the Brabender. The Brabender was operated at 100 rpm and at temperature of 180° C. Mixing time at temperature was 5-10 minutes, after which the sample was removed from the mixing chamber. The homogenized samples were molded under compression into film on a Carver hydraulic press for analysis. About 7 grams of the homogenized polymer were molded between brass platens lined with Teflon™ coated aluminum foil. A 0.033 inch (0.08 cm) thick chase with a square opening 4 inch×4 inch (10.2×10.2 cm) was used to control sample thickness. After one minute of preheat at 170° C. or 180° C., under minimal pressure, the hydraulic load was gradually increased to 10,000 to 15,000 lbs, at which it was held for three minutes. Subsequently the sample and molding plates were cooled for three minutes under 10,000 to 15,000 lbs load between the water-cooled platens of the press. Plaques were allowed to equilibrate at room temperature for a minimum of 24 hours prior to physical property testing.

Loss Modulus (E"), Storage Modulus (E') and β relaxation were measured by dynamic mechanical thermal analysis (DMTA). The instrument used was the RSA II, Rheometrics Solid Analyzer II from TA Instruments, New Castle, Del. The instrument was operated in tension mode and used molded rectangular samples. Sample conditions were: 0.1% strain, 1 Hz frequency, and 2° C. per minute heating rate, covering the temperature range from −135° C. to the melting point of the sample. Samples were molded at about 200° C. Typical sample dimensions were 23 mm length×6.4 mm width×thickness between 0.25 mm and 0.7 mm, depending on the sample. Tan δ is the ratio of E"/E'. The output of these DMTA experiments is the storage modulus (E') and loss modulus (E"). The storage modulus measures the elastic response or the ability of the material to store energy, and the loss modulus measures the viscous response or the ability of the material to dissipate energy. The ratio of E"/E' (=tan δ) gives a measure of the damping ability of the material. Energy dissipation mechanisms (i.e., relaxation modes) show up as peaks in tan δ, and are associated with a drop in E' as a function of temperature. The uncertainty associated with reported values of E is expected to be on the order of ±10%, due to variability introduced by the molding process.

Shore hardness was determined according to ISO 868 at 23° C. using a Durometer.

Stress-strain properties such as ultimate Tensile Strength, ultimate elongation, and 100% modulus were measured on 2 mm thick compression molded plaques at 23° C. by using an Instron testing machine according to ISO 37.

Compression set test was measured according to ISO 815A.

Tension set was measured according to ISO 2285.

Oil swell (oil gain) was determined after soaking a die-cut sample from compression molded plaque in IRM No. 3 fluid for 24 hours at 125° C. according to ASTM D 471.

LCR viscosity was measured using Laboratory Capillary Rheometer according to ASTM D 3835-02 using a Dynisco Capillary rheometer at 30:1 UD (length/diameter) ratio, a shear rate of 1200 l/s and a temperature of 204° C. The entrance angle of the laboratory capillary rheometer is 180°, barrel diameter is 9.55 mm. The heat soak time is 6 minutes.

Examples 1A to 1C

This example demonstrates the in-situ reactor blend and the post-reactor vulcanized blend. A polymer blend was produced in a two-stage polymerization reaction by polymerizing propylene in a first stage to make homopolymer, and copolymerizing propylene and ethylene as well as a diene cross-linking agent in a second stage in the presence of the homopolymer produced in the first stage. The polymerization was carried out in a 2-liter autoclave reactor equipped with a stirrer, an external water/steam jacket for temperature control, a regulated supply of dry nitrogen, ethylene, and propylene, and a septum inlet for introduction of other solvents, catalysts and scavenger solutions. The reactor was first washed using hot toluene and then dried and degassed thoroughly prior to use. All the solvents and monomers were purified by passing through a 1-liter basic alumina column activated at 600° C., followed by a column of molecular sieves activated at 600° C. or Selexsorb CD column prior to transferring into the reactor.

In the first stage of polymerization, 3 ml of tri-n-octylaluminum (TNOA) (25 wt % in hexane, Sigma Aldrich) solution was first added to the reactor. In succession, solvent (diluent) and propylene were added into the reactor. All of these were conducted at room temperature. The mixture was then stirred and heated to the desired temperature for the polypropylene polymerization stage. Then the catalyst solution was cannulated into the reactor using additional propylene. The first stage of polymerization was ended when the desired amount of polypropylene was produced. Thereafter, the reactor was heated up to the desired temperature of the elastomeric copolymerization stage. About 6 to 12 ml of air was injected into the reactor with about 100 ml of additional solvent to partially deactivate the catalyst used in the first stage of polymerization. The reaction medium was kept under proper mixing for about 8 minutes to allow good catalyst-air contact prior to second stage of polymerization. The reactor was then pressurized to about 400 psig with ethylene. Then, in succession, diene, additional scavenger (TNOA or TEAL) and the second catalyst solution were added into the reactor. Additional ethylene was fed into the reactor, and the ethylene was fed on demand to maintain a relatively constant reactor pressure during the elastomeric copolymerization reaction. The elastomeric copolymerization reaction was terminated when desired amount of rubber was produced. Thereafter, the reactor was cooled down and unreacted monomer and solvent (diluent) were vented to the atmosphere. The resulting mixture, containing mostly solvent, polymer and unreacted monomers, was collected in a collection box and first air-dried in a hood to evaporate most of the solvent, and then dried in a vacuum oven at a temperature of about 90° C. for about 12 hours.

1,9-decadiene was used as the diene cross-linking agent in the elastomeric copolymerization stage. The 1,9-decadiene was obtained from Sigma-Aldrich and was purified by first passing through an alumina column activated at high temperature under nitrogen, followed by a molecular sieve activated at high temperature under nitrogen.

Rac-dimethylsilyl bis(2-methyl-4-phenylindenyl) zirconium dimethyl catalyst (Catalyst A) was used in the first stage to produce polypropylene and [di(p-triethylsilylphenyl) methylene] (cyclopentadienyl) (3,8-di-t-butylfluorenyl) hafnium dimethyl catalyst (Catalyst B) (obtained from Albemarle) was used in the second stage to produce ethylene propylene diene rubber. Both catalysts were preactivated by dimethylanilinum tetrakis(heptafluoro-2-naphthyl) borate at a molar ratio of 1:1 in toluene. Details of the experimental conditions, catalysts employed and the properties of the resultant polymer blends are listed in Table 1A below.

TABLE 1A

| | Sample # | | |
|---|---|---|---|
| | 1A | 1B | 1C |
| Polymerization in Stage 1 | | | |
| Reaction temperature (° C.) | 75 | 75 | 75 |
| Amount of catalyst A (mg) | 0.6 | 0.5 | 0.5 |
| Propylene #1 (ml) | 700 | 700 | 700 |
| Toluene (ml) | 500 | 500 | 500 |
| TNOA (25 wt %) (ml) | 3 | 3 | 3 |
| Reaction time 1 (min) | 11 | 7 | 7 |
| Polymerization in Stage 2 | | | |
| Reaction temperature (° C.) | 75 | 75 | 80 |
| Amount of catalyst B (mg) | 1.2 | 1 | 1.1 |
| TNOA (25 wt %) (ml) | 5 | 5 | 5 |
| Ethylene head pressure (psi) | 230 | 250 | 250 |
| 1,9-decadiene (ml) | 47 | 50 | 50 |
| Toluene (ml) | 300 | 300 | 300 |
| Reaction time 2 (min) | 22 | 8 | 19 |
| Yield (g) | 57.3 | 53.1 | 119.0 |
| Tm (° C.) | 157.8 | 155.3 | 150.6 |
| Tc (° C.) | 109.3 | 111.4 | 102.4 |
| Heat of fusion (J/g) | 50.6 | 40.0 | 22.8 |
| Tg (° C.) | −46.4 | −48.1 | −44.0 |
| Ethylene content (wt %) | — | — | 22.4 |
| Xylene precipitate (wt %) | 45.0 | 45.0 | 22.7 |
| Xylene insolubles (wt %) | 23.1 | 29.7 | 60.1 |
| Xylene solubles (wt %) | 22.4 | 18.4 | 11.2 |

TABLE 1A-continued

| | Sample # | | |
|---|---|---|---|
| | 1A | 1B | 1C |
| Cyclohexane solubles (wt %) | 9.4 | 6.9 | 6.0 |
| Degree of cross-link (%) | 42.1 | 54.1 | 77.8 |

Degree of cross-linking is defined as:

$$\text{Degree of cross-link} = \frac{\text{Percent of xylene insoluble}}{100 - \text{percent of xylene precipitate}} \times 100$$

Desirably, the degree of cross-link for the inventive, in situ blend (prior to post-reactor cross-linking) is at least 20 or 30 or 40%, or within a range from 20 or 30 or 35% to 70 or 80 or 85 or 90%.

The Tg values shown in the table above refer to the elastomer component in the reactor-produced blend examples. The values provide an indication of the amorphous nature of the elastomer component. The Tg of the polypropylene component—located primarily in the xylene precipitate fraction—is generally about 0° C., typical for semi-crystalline propylene homopolymers.

The polymer blends produced in Examples 1A-1C were melt mixed in a Brabender mixer and molded under compression into plaques, and tested for thermoplastic elastomer applications. Polymer blends produced in Examples 1A-1C were also further vulcanized by dynamic vulcanization. The vulcanization was effected by conventional techniques within a Brabender mixer along with the other added ingredients listed in Table 1B. Silicon hydride DC 25804 (1.97%) was obtained from Dow Corning. The silicon hydride was a polysiloxane with silicon hydride functionality. Platinum catalyst mixture (PC085) (2.63%) was obtained from United Chemical Technologies Inc. The catalyst mixture included 0.0055 parts by weight platinum catalyst and 2.49 parts by weight mineral oil. Zinc oxide was obtained from Zinc Corporation of America and paraffinic oil Paralux 6001R was obtained from Chevron Oil Corporation. The performance data obtained according to the procedures described above are listed in Table 1B.

TABLE 1B

| | Formulation # | | | | | |
|---|---|---|---|---|---|---|
| | 11 | 12 | 13 | 14 | 15 | 16 |
| Polymer | 1A | 1B | 1C | 1A | 1B | 1C |
| Polymer (wt %) | 100 | 100 | 100 | 65.79 | 65.79 | 65.79 |
| Paralux 6001R (wt %) | 0 | 0 | 0 | 28.29 | 28.29 | 28.29 |
| DC25804 (wt %) | 0 | 0 | 0 | 1.97 | 1.97 | 1.97 |
| PC 085 (wt %) | 0 | 0 | 0 | 2.63 | 2.63 | 2.63 |
| Zinc oxide (wt %) | 0 | 0 | 0 | 1.32 | 1.32 | 1.32 |
| Hardness (shore A) | 88 | 91 | 75 | 83 | 84 | 60 |
| Ultimate tension strength (psi) | 2037 | 2330 | 1255 | 1568 | 1890 | 557.6 |
| Ultimate elongation (%) | 286 | 364 | 125 | 227 | 259 | 137.6 |
| 100% Modulus (psi) | 1517 | 1704 | 1138 | 956 | 998 | 441.2 |
| LCR viscosity 12001/s (Pa-s) | NA | NA | NA | 120.4 | 119 | 133.2 |
| Tension set (%) | 36.5 | 39.2 | 15 | 17 | 20 | NA |
| Compression set, 70° C./22 Hrs (%) | 55.1 | 56.9 | 29.4 | 35.3 | 37 | 24.4 |
| Weight gain, 121° C./24 hrs (%) | 171.3 | 186.1 | 254.9 | 79 | 79 | 149 |

The improvements of dynamic vulcanized polymer blends were noticed by the enhancement in elastomeric properties such as compression set and weight gain.

The three polymer blends produced in Examples 1A to 1C were subjected to solvent extraction. The amount of each fraction is listed in Table 1A. The xylene precipitate fraction of Example 1C has a peak melting temperature of 155° C., a peak crystallization temperature of 117° C. and a $\Delta H_f$ of 114 J/g obtained from DSC. The xylene insoluble fraction has an ethylene content of 27.7 wt %.

The morphology of the blend produced in Example 1C and the dynamically post polymerization vulcanized polymer blend in example 1C (see Formulation 16 in Table 1B) were examined using AFM according to the procedure described above and the results are shown in FIGS. 1A and 1B.

Examples 2A and 2B

These two samples were produced in a 2-liter autoclave reactor following the same procedure as that used in Examples 1A to 1C, except that 5-vinyl-2-norbornene (VNB) was used as the cross-linking agent in the elastomeric copolymerization stage. VNB was obtained from Sigma-Aldrich and was purified by first passing through an alumina column activated at high temperature under nitrogen, followed by a molecular sieve activated at high temperature under nitrogen. The detailed reaction conditions and polymer properties are listed in Table 2A.

TABLE 2A

| | Sample # | |
|---|---|---|
| | 2A | 2B |
| Polymerization in Stage 1 | | |
| Reaction temperature (° C.) | 75 | 75 |
| Amount of catalyst A (mg) | 0.5 | 0.5 |
| Propylene #1 (ml) | 600 | 600 |
| Toluene (ml) | 500 | 500 |
| TNOA (25 wt %) (ml) | 3 | 3 |
| Reaction time 1 (min) | 5.5 | 3 |
| Polymerization in Stage 2 | | |
| Reaction temperature (° C.) | 75 | 75 |
| Amount of catalyst B (mg) | 1.6 | 2 |
| TNOA (25 wt %) (ml) | 10 | 10 |
| Propylene 2 (ml) | 100 | 100 |
| Ethylene head pressure (psi) | 230 | 230 |
| VNB (ml) | 20 | 40 |
| Toluene (ml) | 300 | 300 |
| Reaction time2 (min) | 37 | 20 |
| Yield (g) | 101 | 104 |
| Tm (° C.) | 158.6 | 157.7 |
| Tc (° C.) | 111.0 | 111.1 |
| Heat of fusion (J/g) | 35.5 | 49.0 |
| Tg (° C.) | -51.2 | -51.5 |
| Ethylene content (wt %) | | |

The polymer blends produced in Examples 2A and 2B were melt mixed in a Brabender mixer and molded under compression into plaques, and tested for thermoplastic elastomer applications. Polymer blends produced in Examples 2A and 2B were also vulcanized by dynamic vulcanization. The vulcanization was effected by conventional techniques within a Brabender mixer in the presence of the other added ingredients listed in Table 2B. The performance data obtained using the procedure described above are listed in Table 2B. The improvements of dynamic vulcanized polymer blends were noticed by the enhancement in elastomeric properties such as compression set and weight gain.

TABLE 2B

| | Formulation # | | | |
|---|---|---|---|---|
| | 21 | 22 | 23 | 24 |
| Polymer | 2A | 2A | 2B | 2B |
| Polymer (wt %) | 100 | 91.74 | 100 | 91.74 |
| SiH (DC 2-5084) (wt %) | 0 | 2.75 | 0 | 2.75 |
| Pt (PC085) (wt %) | 0 | 3.67 | 0 | 3.67 |
| Zinc oxide (wt %) | 0 | 1.83 | 0 | 1.83 |
| Hardness | 87A | 87A | 94A | 90A |
| Ultimate tension strength (psi) | 1616 | 1435 | 2544 | 3760 |
| Ultimate elongation (%) | 403 | 99 | 468 | 269 |
| 100% Modulus (psi) | 1274 | 1564 | 1682 | 2222 |
| Tension set (%) | 31.75 | broke | 37.25 | 29.75 |
| Compression set, 70° C./22 Hrs (%) | 60.58 | 36.66 | 55.5 | 40.92 |
| Weight gain, 121° C./24 hrs (%) | 354.92 | 150.69 | 200.39 | 109.08 |
| Xylene precipitate (wt %) | 45.2 | 31.4 | 51.1 | 42.4 |
| Xylene insolubles (wt %) | 18.9 | 61.5 | 27.3 | 52.1 |
| Xylene solubles (wt %) | 28.4 | 3.0 | 17.1 | 2.4 |
| Cyclohexane solubles (wt %) | 7.6 | 4.3 | 4.4 | 3.3 |
| Degree of cross-link (%) | 34.5 | 89.5 | 55.8 | 90.3 |

The two polymer blends produced in Examples 2A and 2B as well as the post polymerization vulcanized composition (Formulation 22 and 24 in Table 2B) were subjected to solvent extraction. The amount of each fraction is listed in Table 2B. The amount of cycloheaxane soluble fraction in example 2A and 2B after post polymerization curing were below 5% indicative of high state of vuncanize of rubber phase in these blends.

Examples 3A and 3B

These two samples were produced in a 2-liter autoclave reactor following the same procedure as that used in Examples 1A to 1C, except that (1) no air was injected into the reactor at the end of the first stage of polymerization; (2) a supported catalyst (Catalyst C) was used in the first stage of polymerization to produce polypropylene and (3) triethyl aluminum (TEAL) (1M in hexane, Sigma Aldrich) was used as scavenger. The catalyst system included a metallocene catalyst on a fluorided ("F") silica support, and a non-coordinating anion ("NCA") activator, such as described in U.S. Pat. No. 6,143,686. The catalyst system was prepared as described in U.S. Pat. No. 6,143,686 by combining trisperfluorophenylboron in toluene (Albemarle Corporation, Baton Rouge, La.) with N,N-diethyl aniline and then mixing the combination with fluorided silica. Rac-dimethylsilanyl-bis(2-methyl-4-phenylindenyl)zirconium dimethyl was then added.

The fluorided silica is described in WO 00/12565. Generally, to prepare the fluorided silica, $SiO_2$ supplied by Grace Davison, a subsidiary of W. R. Grace Co., Conn., as Sylopol™ 952 ("952 silica gel") having a $N_2$ pore volume of 1.63 cc/gm and a surface area of 312 $m^2$/gm, was dry mixed with 0.5 to 3 grams of ammonium hexafluorosilicate supplied by Aldrich Chemical Company, Milwaukee, Wis. The amount of ammonium hexafluorosilicate added corresponded to 1.05 millimole F per gram of silica gel. The mixture was transferred to a furnace and a stream of $N_2$ was passed up through the grid to fluidize the silica bed. The furnace was heated according to the following schedule:

Raise the temperature from 25° C. to 150° C. over 5 hours;

Hold the temperature at 150° C. for 4 hours;

Raise the temperature from 150° C. to 500° C. over 2 hours;

Hold the temperature at 500° C. for 4 hours;

Turn heat off and allow to cool under $N_2$;

When cool, the fluorided silica was stored under $N_2$.

The catalyst system was suspended in oil slurry for ease of addition to the reactor. Drakeol™ mineral oil (Penreco, Dickinson, Tex.) was used. The detailed reaction condition and polymer properties are listed in Table 3A.

TABLE 3A

| | Sample # | |
|---|---|---|
| | 3A | 3B |
| Polymerization in Stage 1 | | |
| Reaction temperature (° C.) | 50 | 50 |
| Amount of catalyst C (mg) | 138 | 140 |
| Propylene #1 (ml) | 800 | 800 |
| TEAL(1M in hexane) (ml) | 2 | 2 |
| H2 (mmol) | 8.3 | 12.5 |
| Reaction time 1 (min) | 180 | 240 |
| Polymerization in Stage 2 | | |
| Reaction temperature (° C.) | 59 | 55 |
| Amount of catalyst B (mg) | 2 | 0.8 |
| TEAL(1M in hexane) (ml) | | |
| Ethylene head pressure (psi) | 220 | 210 |
| 1,9-decadiene (ml) | 6 | 8 |
| Hexane (ml) | 600 | 600 |
| Reaction time 2 (min) | 23 | 30 |
| Yield (g) | 301 | 360 |
| Tm (° C.) | 152.3 | 150.0 |
| Tc (° C.) | 103.6 | 97.8 |
| Heat of fusion (J/g) | 40.1 | 36.7 |
| Tg (° C.) | — | — |
| Ethylene content (wt %) | 23.5 | 25.0 |
| Xylene precipitate (wt %) | 35.3 | 32.9 |
| Xylene insolubles (wt %) | 35.1 | 43.4 |
| Xylene solubles (wt %) | 11.7 | 7.8 |
| Cyclohexane solubles (wt %) | 17.9 | 15.7 |
| Degree of cross-link (%) | 54.3 | 64.7 |

The polymer blends produced in Examples 3A and 3B were melt mixed in a Brabender mixer and molded under compression into plaques, and tested for thermoplastic elastomer applications. Polymer blends produced in Examples 3A and 3B were also vulcanized by dynamic vulcanization. The vulcanization was effected by conventional techniques within a Brabender mixer along with the other added ingredients listed in Table 3B and 3C. SP1045 is a phenolic resin obtained from Schenectady International (Schenectady, N.Y.). Sunpar 150M is process oil obtained from Sunoco, Inc., Philadelphia, Pa. Structurally, Sunpar 150 M has a predominance of saturated rings and long paraffinic side chains. Stannous chloride anhydrous was obtained from Mason Corp., U.S. Route 41, Schererville, Ind. PP is homopolypropylene obtained from Equistar under trade name of Equistar F008F. The performance data obtained using the procedure described above are listed in Table 3B and 3C. The improvements of dynamic vulcanized polymer blends were noticed by the enhancement in elastomeric properties such as compression set and weight gain.

TABLE 3B

| | Formulation # | | | |
|---|---|---|---|---|
| | 31 | 32 | 33 | 34 |
| Polymer | 3A | 3A | 3A | 3A |
| Polymer (wt %) | 100 | 64.93 | 58.5 | 65.89 |
| Oil | — | Paralux 6001R | Paralux 6001R | Sunpar 150M |
| Oil (wt %) | 0 | 29.22 | 26.32 | 28.34 |
| PP (wt %) | 0 | | 9.94 | 0 |
| Curing agent | — | SiH-DC25804 | SiH-DC25804 | SP1045 |
| Curing agent(wt %) | 0 | 1.95 | 1.75 | 3.62 |
| PC 085 (wt %) | 0 | 2.6 | 2.3 | 0 |
| Zinc oxide (wt %) | 0 | 1.3 | 1.19 | 1.32 |
| Stannous chloride (wt %) | 0 | 0 | 0 | 0.83 |
| Hardness (shore A) | 81 | 65 | 76 | 63 |
| Ultimate tension strength (psi) | 887 | 845 | 965 | 583 |
| Ultimate elongation (%) | 246 | 271 | 243 | 319 |
| 100% Modulus (psi) | 716 | 444 | 638 | 343 |
| LCR viscosity 1200 1/s (Pas) | 232.4 | 103 | 105 | 121.9 |
| Tension set (%) | 31.25 | 12 | 19 | 20 |
| Compression set, 70° C./22 Hrs (%) | 60.6 | 28.5 | 37.7 | 49.3 |
| Weight gain, 121° C./24 hrs (%) | 337.8 | 76.0 | 60.0 | 119.0 |

TABLE 3C

| | Formulation # | | | | |
|---|---|---|---|---|---|
| | 35 | 36 | 37 | 38 | 39 |
| Polymer | 3B | 3B | 3B | 3B | 3B |
| Polymer (wt %) | 100.0 | 69.9 | 65.0 | 58.5 | 65.9 |
| Oil | — | Sunpar 150M | Paralux 6001R | Paralux 6001R | Sunpar 150M |
| Oil (wt %) | 0 | 30.1 | 29.2 | 26.3 | 28.3 |
| PP (wt %) | 0 | 0 | 0 | 9.94 | 0 |
| Curing agent | | | SiH-DC25804 | SiH-DC25804 | SP1045 |
| Curing agent (wt %) | 0 | 0 | 1.95 | 1.75 | 3.62 |
| Pt Catalyst (PC 085) (wt %) | 0 | 0 | 2.6 | 2.3 | 0.0 |
| Zinc oxide (wt %) | 0 | 0 | 1.3 | 1.2 | 1.3 |
| Stannous chloride (wt %) | 0 | 0 | 0 | 0 | 0.83 |
| Hardness (shore A) | 77 | 55 | 56 | 75 | 57 |
| Ultimate tension strength (psi) | 575 | 228 | 262 | 587 | 440 |
| Ultimate elongation (%) | 131 | 108 | 118 | 145 | 207 |
| 100% Modulus (psi) | 531 | 225 | 245 | 511 | 287 |
| LCR viscosity 1200 1/s (Pas) | 131.4 | 35.3 | 40.6 | 49.5 | 75.4 |
| Tension set (%) | Broke | Broke | NA | 16.2 | 9 |
| Compression set, 70° C./22 Hrs (%) | 42.1 | 35.0 | 36.8 | 39.2 | 28.5 |
| Weight gain, 121° C./24 hrs (%) | 270.2 | 180.2 | 102.4 | 70.5 | 98.9 |

The two polymer blends produced in Examples 3A and 3B were subjected to solvent extraction. The amount of each fraction is listed in Table 3A. Some of the physical properties of the fractionated components from the polymer blend of Example 3A are listed in Table 3D

TABLE 3D

| Fraction | Cyclohexane soluble | Xylene Insoluble | Xylene Precipitate | Xylene Solubles |
|---|---|---|---|---|
| Tc (° C.) | — | — | 117.3 | — |
| Tm (° C.) | — | 144.7 | 151.5 | — |
| Tg (° C.) | — | — | — | — |
| Heat of fusion (J/g) | — | 0.2 | 95.6 | — |
| Mn (kg/mol) | — | — | — | — |
| Mw (kg/mol) | — | — | — | — |
| Mz (kg/mol) | — | — | — | — |
| g'vis | — | — | — | — |
| Ethylene content (wt %) | 39.6 | — | — | — |

Formulations 32, 37 and 39 were also subjected to solvent extraction and the amount of each fraction is listed in Table 3E.

TABLE 3E

| | Formulation | | |
|---|---|---|---|
| | 32 | 37 | 39 |
| Xylene Precipitate (wt %) | 22.34 | 21.63 | 22.05 |
| Xylene Insoluble (wt %) | 41.07 | 34.98 | 31.58 |
| Xylene Solubles (wt %) | 2.66 | 6.06 | 8.44 |
| Cyclohexane Solubles (wt %) | 2.15 | 3.54 | 4.82 |
| Azeotrope Solubles (wt %) | 31.78 | 33.79 | 33.11 |
| Level of curing (%) | 89.52 | 78.47 | 70.43 |

Level of curing is defined as $$\text{Level of curing}(\%) = \frac{\text{percent of xylene insoluble}}{100 - \text{percent of xylene precipitate} - \text{azeotrope soluble}} \times 100$$

Degree of cross-linking and degree of curing would have the same value for in-reactor produced polymer blend without any oil.

The morphology of the polymer blend produced in Example 3A and its counter part of the post polymerization vulcanized composition (formulation 34 in Table 3B) were examined using AFM according to the procedure described above and the results are shown in FIGS. 2A and 2B. It was observed that the rubber was in the discrete particle phase embedded in polypropylene continuous phase. Particle-in-particle or subinclusion type of morphology was also observed.

Examples 4A and 4B

These two samples were produced in a 2-liter autoclave reactor following the same procedure as that used in Examples 3A and 3B except that about 12 ml of air was injected into the reactor at the end of the first stage of polymerization.

TABLE 4A

| | Sample # | |
|---|---|---|
| | 4A | 4B |
| Polymerization in Stage 1 | | |
| Reaction temperature (° C.) | 50 | 50 |
| Amount of catalyst C (mg) | 400 | 52 |
| Propylene #1 (ml) | 700 | 700 |

TABLE 4A-continued

|  | Sample # | |
| --- | --- | --- |
|  | 4A | 4B |
| TEAL(1M in hexane) (ml) | 2 | 1 |
| H2 (mmole) | 8.3 | 4.2 |
| Reaction time 1 (min) | 20 | 100 |
| Polymerization in Stage 2 | | |
| Reaction temperature (° C.) | 75 | 100 |
| Amount of catalyst B (mg) | 1 | 3.2 |
| Scavenger | TEAL(1M in hexane) | TNOA (25 wt %) |
| Scavenger amount (ml) | 3 | 10 |
| Propylene 2 (ml) | 0 | 100 |
| Ethylene head pressure (psi) | 230 | 230 |
| 1,9-decadiene (ml) | 50 | 40 |
| Toluene (ml) | 800 | 800 |
| Reaction time 2 (min) | 15 | 8 |
| Yield (g) | 160 | 167 |
| Tm (° C.) | 155.6 | 144.2 |
| Tc (° C.) | 111.0 | 100.3 |
| Heat of fusion (J/g) | 37.8 | 19.1 |
| Tg (° C.) | −48.3 | −36.6 |
| Ethylene content (wt %) | 23.6 | 18.9 |
| Xylene precipitate (wt %) | 30.9 | 21.9 |
| Xylene insolubles (wt %) | 46.6 | 64.1 |
| Xylene solubles (wt %) | 3.4 | 8.4 |
| Cyclohexane solubles (wt %) | 10.9 | 5.7 |
| Degree of cross-link (%) | 67.4 | 82.1 |

The polymer blends produced in Examples 4A and 4B were melt mixed in a Brabender mixer and molded under compression into plaques, and tested for thermoplastic elastomer applications. Polymer blends produced in Examples 4A and 4B were also vulcanized by dynamic vulcanization. The vulcanization was effected by conventional techniques within a Brabender mixer along with the other added ingredients listed in Table 4B. The performance data obtained using the procedure described above are listed in Table 4B. The improvements of dynamic vulcanized polymer blends were noticed by the enhancement in elastomeric properties such as compression set and weight gain.

The polymer blend produced in Example 4B and its counterpart of the post-polymerization vulcanized composition (formulation 45 in Table 4B) were subjected to solvent extraction. The xylene insoluble fraction was increased from 64.1% for the in-reactor produced blend to 69.5% for post polymerization vulcanized one, and cross-linking level increased from 82.0% to 88.2% after post polymerization curing.

TABLE 4B

|  | Formulation # | | | | | |
| --- | --- | --- | --- | --- | --- | --- |
|  | 41 | 42 | 43 | 44 | 45 | 46 |
| Polymer | 4A | 4A | 4A | 4B | 4B | 4B |
| Polymer (wt %) | 100 | 91.73 | 65.79 | 100 | 91.74 | 65.79 |
| Paralux 6001R (wt %) | 0 | 0 | 28.29 | 0 | 0 | 28.29 |
| SiH-DC25804 (wt %) | 0 | 2.75 | 1.97 | 0 | 2.75 | 1.97 |
| PC085 (wt %) | 0 | 3.67 | 2.63 | 0 | 3.67 | 2.63 |
| Zinc oxide (wt %) | 0 | 1.83 | 1.32 | 0 | 1.83 | 1.32 |
| Hardness | 91A | 92A | 78A | 78A | 76A | 58A |
| Ultimate tension strength (psi) | 1334 | 1460 | 692.2 | 1354 | 1165 | 644.3 |
| Ultimate elongation (%) | 158.8 | 95.62 | 81.61 | 138.3 | 147.8 | 146 |
| 100% Modulus (psi) | 1178 | — | — | 1131 | 836.6 | 453.4 |
| Viscosity 12001/s (Pa-s) | 192.3 | 183.8 | 56.5 | Over load | 256.7 | 119.8 |
| Tension set (%) | 27.75 | 23.5 | Broke | 13.75 | 12 | 8.5 |
| Compression set, 70° C./22 Hrs (%) | 56.8 | 45.3 | 37.4 | 31.5 | 32.4 | 24.7 |
| Weight gain, 121° C./24 hrs (%) | 189.9 | 147.1 | 99.9 | 339.2 | 224.1 | 195.1 |

The morphology of the polymer blend produced in Example 4B and its counter part of the post polymerization vulcanized composition (formulation 45 in Table 4B) were examined using AFM according to the procedure described above and the results are shown in FIGS. 3A and 3B. It was observed that the rubber was in the discrete particle phase embedded in polypropylene continuous phase.

Comparative Example with Diene ENB

Polymerizations were carried out in two, one liter stirred reactors in series with continuous flow of feeds to the system and continuous withdrawal of products. Isohexane (used as the solvent), and monomers (e.g., ethylene, propylene and ENB (5-ethylidene-2-norbornene)) were purified over beds of alumina and molecular sieves. Toluene for preparing catalyst solutions was also purified by the same technique. All feeds were pumped into the reactors by metering pumps except for the ethylene which flowed as a gas under its own pressure through a Brooksfield flow controller. All liquid flow rates were measured using Brooksfield mass flow controller. The reactors were equipped with a stirrer, a water cooling/steam heating element with a temperature controller and a pressure controller. The reactors were maintained at a pressure in excess of the vapor pressure of the reactant mixture to keep the reactants in the liquid phase. The reactors were operated liquid full. Ethylene and propylene feeds were combined into one stream and then mixed with a pre-chilled isohexane stream that had been cooled to at least 0° C. ENB was diluted with isohexane and fed into the reactor using a metering pump.

An isohexane solution of triisobutyl aluminum scavenger was added to the combined solvent and monomer stream just before it entered the reactor to further reduce the concentration of any catalyst poisons. The feed rate of the scavenger solution was adjusted in a range from 0 (no scavenger) to 1.5E−05 mole per minute to optimize catalyst activity. rac-dimethyl silylbis(indenyl)hafnium dimethyl was pre-activated with N,N-dimethyl anilinium tetrakis (pentafluorophenyl) borate at molar ratio of about 1:1 in toluene. The catalyst solution was then fed into the first reactor through a separate port using an Isco syringe pump.

Ethylene, propylene and pre-activated catalyst solution were fed into the first reactor, and ethylene/propylene copolymer was produced in the first reactor. The solution of polymer, solvent, unconverted monomers, and catalyst exiting the first reactor entered the second reactor. ENB and additional isohexane, ethylene and propylene were fed into the second reactor through a separate port. The product from the second reactor exited through a pressure control valve that reduced the pressure to atmospheric. This caused the unconverted monomers in the solution to flash into a vapor phase which was vented from the top of a vapor liquid separator. The liquid phase, comprising mainly polymer and solvent, flowed out the bottom of the separator and was collected for polymer recovery. Isopropanol was added the polymer solution leaving the second reactor to quench the polymerization and precipitate the polymer. Polymer was then recovered from solution by steam stripping following by drying in a vacuum oven. The vacuum oven dried samples were weighed to obtain yields. The detailed polymerization process conditions are listed in Table 5.

TABLE 5

EP-EP/ENB using rac-dimethylsilyl bisindenyl hafnium dimethyl

| Reactor configuration |  | 1st reactor | 2nd reactor |
|---|---|---|---|
| Reaction Temperature | ° C. | 60 | 80 |
| Reactor Pressure | psig | 350 | 350 |
| Isohexane A fed rate | ml/min | 92 | 36 |
| Ethylene fed rate | g/hr | 15 | 234 |
| Propylene fed rate | g/hr | 360 | 42 |
| ENB fed rate | g/hr | 0 | 12.9 |
| Catalyst feed rate | g/hr | 0.00835 | 0 |
| Yield | gram | — | 428.3 |
| Over all Conversion | % | — | 70.2 |
| Xylene insolubles | wt % | — | 0.33 |

The polymer collected from the second reactor was sent to Polyhedron Laboratories, Inc. (10626 Kinghurst St., Houston, Tex. 77099) for fractionation using xylene at reflux. The sample has 0.33 wt % of xylene insoluble. Xylene insoluble is a measure of degree of cross-linking. This test indicates that the sample does not contain cross-linked component. To create cross-linked polymer structures during the polymerization, diene must have at least two polymerizable double bonds. The rubber component can be cross-linked during the polymerization through reactivity at both double bond sites. ENB has two double bonds but only one of them is polymerizable in a metallocene system. During polymerization, ENB is incorporated into a growing polymer chain through the endocyclic double bond only; leaving the exocyclic double bond unreacted. Since it is unreactive during the polymerization, no reactor cross-linking can occur. The unreacted double bond is available for use (e.g., cross-linking and functionalization) post-reactor.

Inventive and Comparative Examples of High Vinyl Chain End and High Tm Polypropylene in the First Reactor It was found that the crystallinity of polypropylene produced in the first stage of polymerization influenced the production of the second polymer with micro-sized gel in the second stage of polymerization. Previously, it wasn't well understood why the presence of isotactic polypropylene (iPP) can reduce reactor gel formation. The speculation was that the iPP formed microscopic pockets within the crystalline network in the reaction medium in the second stage. The second polymerization and cross-linking reaction takes place within the microscopic pockets. This confined polymerization environments prevents the micro-gel particles from agglomeration, thereby minimizing inter-particle cross-linking and formation of larger, undesirable gels. In contrast, if the cross-linking reaction is not controlled to localized domains, uncontrolled cross-linking will interconnect the polymeric contents of the entire reactor, leading to reactor macro-gel formation and fouling.

To examine the properties of polypropylene made in the first reactor, a separated experiment was carried out to make polypropylene using the same catalyst system. The polypropylenes (iPP) were produced in a 0.5-liter Autoclave reactor operated in the continuous stirred-tank solution process. The reactor was equipped with a stirrer, a water-cooling/steam-heating element with a temperature controller, and a pressure controller. Solvents, monomers such as propylene were first purified by passing through beds of alumina and molecular sieves.

The solvent feed rate to the reactors was measured by a mass flow meter. A Pulsa feed pump increased the solvent pressure to the reactors. The compressed, liquefied propylene feed was measured by a mass flow meter and the flow was controlled by a Pulsa feed pump. The solvent and monomers were fed into a manifold first. The mixture of solvent and monomers were then chilled to about −15° C. by passing through a chiller prior to feeding into the reactor through a single port. The collected samples were first air-dried in a hood to evaporate most of the solvent, and then dried in a vacuum oven at a temperature of about 90° C. for about 12 hours. The vacuum oven dried samples were weighed to obtain yields. Monomer conversion was calculated basing the polymer yield on the amount of monomers fed into the reactor. All the reactions were carried out at a pressure of about 2.4 MPa/g.

A rac-dimethylsilyl bis(2-methyl-4-phenylindenyl) zirconium dimethyl (catalyst A) was used. This catalyst was pre-activated with N,N-dimethyl anilinium tetrakis (heptafluoro-2-naphthyl) borate (Activator I) at a molar ratio of about 1:1 in 900 ml of toluene. For comparison, rac-dimethylsilyl bisindenyl hafnium dimethyl (Catalyst D) was also used. This catalyst was pre-activated with N,N-dimethylanilinium tetrakis(pentafluorophenyl) borate (Activator II) at a molar ratio of about 1:1 in toluene. All catalyst solutions were kept in an inert atmosphere and fed into reactor by metering pumps. Tri-n-octylaluminum (TNOAL) solution (available from Sigma Aldrich, Milwaukee, Wis.) was further diluted in isohexane and used as a scavenger. Both catalyst feed rate and scavenger feed rate were adjusted to achieved the conversion listed in the following table. Hexane was used as solvent and its feed rate was 52.5 gram/min. Propylene feed rate was 14 gram/min. The detailed process conditions and some characteristics of the polypropylene are listed in Tables 6 and 7.

TABLE 6

Polypropylene made using rac-dimethylsilyl bis(2-methyl-4-phenylindenyl) zirconium dimethyl

|  | Example # | | | | |
|---|---|---|---|---|---|
|  | PP01 | PP02 | PP03 | PP04 | PP05 |
| Polymerization temperature (° C.) | 130 | 120 | 110 | 100 | 90 |
| Conversion (%) | 57.9 | 60.8 | 62.0 | 62.5 | 63.4 |
| Productivity (g polymer/g catalyst) | 48,660 | 51,060 | 52,110 | 52,470 | 53,280 |
| Mn DRI (g/mol) | 8,679 | 16,218 | 24,286 | 36,835 | 56,615 |
| Mw DRI (g/mol) | 23,374 | 38,463 | 57,795 | 91,361 | 138,606 |

TABLE 6-continued

Polypropylene made using rac-dimethylsilyl bis(2-methyl-4-phenylindenyl) zirconium dimethyl

| | Example # | | | | |
|---|---|---|---|---|---|
| | PP01 | PP02 | PP03 | PP04 | PP05 |
| Mz DRI (g/mol) | 37,524 | 67,243 | 100,413 | 166,096 | 259,498 |
| Tc (° C.) | 95.1 | 98.8 | 103.6 | 106.0 | 109.4 |
| Tm (° C.) | 132.2 | 137.2 | 143.4 | 146.1 | 152.9 |
| Heat of fusion (J/g) | 92.3 | 91.5 | 97.6 | 106.6 | 98.7 |
| Vinyls/chain | 0.48 | — | 0.64 | — | 1.01 |

TABLE 7

Polypropylene made using rac-dimethylsilyl bisindenyl hafnium dimethyl

| | Example # | | | |
|---|---|---|---|---|
| | PP06 | PP07 | PP08 | PP09 |
| Polymerization temperature (° C.) | 130 | 110 | 90 | 70 |
| Conversion (%) | 73.9 | 88.1 | 86.1 | 108.6 |
| Productivity (g polymer/g catalyst) | 10,906 | 13,010 | 12,798 | 16,077 |
| Mn DRI (g/mol) | 3,117 | 6,131 | 15,592 | 37,866 |
| Mw DRI (g/mol) | 10,245 | 16,349 | 32,349 | 79,075 |
| Mz DRI (g/mol) | 153,994 | 28,412 | 52,216 | 132,391 |
| Tc (° C.) | 32.3 | 49.3 | 68.4 | 91.7 |
| Tm (° C.) | 69.0 | 90.3 | 107.8 | 127.6 |
| Heat of fusion (J/g) | 19.6 | 35.6 | 56.5 | 67.7 |
| Vinyls/chain | 0.35 | 0.21 | 0.13 | 0.30 |

All documents described herein are incorporated by reference herein, including any priority documents and/or testing procedures to the extent they are not inconsistent with this text. While there have been described what are presently believed to be the preferred embodiments of the present invention, those skilled in the art will realize that other and further embodiments can be made without departing from the spirit of the invention, and is intended to include all such further modifications and changes as come within the true scope of the claims set forth herein.

The invention claimed is:

1. A heterogeneous vulcanized polymer blend comprising:
   (a) a continuous phase comprising a thermoplastic polypropylene having a crystallinity of at least 30% and comprises vinyl terminal groups within the range from 0.40 vinyl/chain to 1.10 vinyl/chain;
   (b) a dispersed phase comprising particles of an elastomeric copolymer dispersed in the continuous phase, the elastomeric copolymer differs from the thermoplastic polypropylene and having a crystallinity less than that of the thermoplastic polypropylene and being at least partially cross-linked such that the degree of cross-link for the elastomeric copolymer particles is within the range from 20% to 90%; and
   (c) wherein the heterogeneous vulcanized polymer blend further comprises branch-block copolymers comprising an amorphous backbone having crystalline side chains, the crystalline side chains originating from the thermoplastic polypropylene.

2. The vulcanized polymer blend of claim 1, wherein the blend has a melting point temperature $T_m$ within a range from 145° C. to 170° C.

3. The vulcanized polymer blend of claim 1, wherein the dispersed phase comprises 50 wt % or more of the blend.

4. The vulcanized polymer blend of claim 1, wherein the thermoplastic polypropylene is a homopolymer.

5. The vulcanized polymer blend of claim 1, wherein the thermoplastic polypropylene is a copolymer of a $C_2$ to $C_{20}$ olefin with less than 15 wt % of at least one comonomer.

6. The vulcanized polymer blend of claim 1, wherein the blend has a $\Delta H_f$ within the range from 18 J/g to 75 J/g.

7. The vulcanized polymer blend of claim 1, having a 100% Modulus of greater than 200 psi, or within the range from 200 psi to 2500 psi.

8. The vulcanized polymer blend of claim 1, having a Tension Set within the range from 6% to 45%.

9. The vulcanized polymer blend of claim 1, wherein the average particle size of the particles of the elastomeric copolymer is between about 50 nanometers and less than 5 microns.

10. The vulcanized polymer blend of claim 1, wherein the average particle size of the particles of the elastomeric copolymer is between about 100 nanometers and about 1 micron.

11. The vulcanized polymer blend of claim 1, and further including one or more additives selected from fillers, extenders, plasticizers, antioxidants, stabilizers, oils, lubricants, and additional polymers.

12. The vulcanized polymer blend of claim 1, wherein the polymer blend is subjected to a vulcanization step by addition of a cross-linking agent to increase the amount of the elastomeric copolymer that is insoluble in xylene.

* * * * *